(12) United States Patent
Yamada et al.

(10) Patent No.: US 8,156,225 B2
(45) Date of Patent: Apr. 10, 2012

(54) METHOD FOR ACCEPTING QOS REQUEST, AND APPARATUS AND COMPUTER READABLE RECORDING MEDIUM PROVIDING THE SAME

(75) Inventors: Akiko Yamada, Kawasaki (JP); Akira Imahase, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 594 days.

(21) Appl. No.: 12/023,233

(22) Filed: Jan. 31, 2008

(65) Prior Publication Data

US 2008/0189416 A1    Aug. 7, 2008

(30) Foreign Application Priority Data

Feb. 5, 2007    (JP) .................................. 2007-026101

(51) Int. Cl.
*G06F 15/173* (2006.01)
*H04L 12/28* (2006.01)
(52) U.S. Cl. ....................................... 709/226; 709/223
(58) Field of Classification Search .................. 709/223, 709/224, 226; 370/225, 228, 229, 230.1, 370/235, 237, 238, 252, 328, 338, 392, 468, 370/477, 395.21, 395.41; 726/1
See application file for complete search history.

(56) References Cited

U.S. PATENT DOCUMENTS 7,609,637 B2 * 10/2009 Doshi et al. .................. 370/235

FOREIGN PATENT DOCUMENTS

| JP | 2001-258065 | 9/2001 |
|---|---|---|
| JP | 2002-117013 | 4/2002 |
| JP | 2004-241835 | 8/2004 |

OTHER PUBLICATIONS

Notification of Reason for Refusal dated Mar. 15, 2011, from corresponding Japanese Application No. 2007-026101.

* cited by examiner

*Primary Examiner* — Peling Shaw
(74) *Attorney, Agent, or Firm* — Katten Muchin Rosenman LLP

(57) ABSTRACT

Disclosed is a method of accepting a QoS request for utilizing resources of a network in a predetermined quality. The method receives from a terminal connected to the network a resource unnecessity notification indicating that resource allocated to the terminal has become unnecessary, and holds, as a free resource information, information on a free resource which is a resource notified by the resource unnecessity notification as unnecessary resource. Then, the method receives the QoS request from the terminal, and determines whether the free resource meets the received QoS request or not on the basis of the free resource information. The method allocates the free resource to the terminal when the free resource meets the received QoS request, and transmits information on the allocated free resource to the terminal.

17 Claims, 19 Drawing Sheets

FIG. 6A

| Section | QoS Class | Bandwidth | Delay | Remaining Bandwodth |
|---------|-----------|-----------|-------|---------------------|
| ER1-ER2 | Delay Guarantee | 20Mbps | 180msec | 20Mbps |
| ER1-ER2 | Bandwidth Guarantee | 20Mbps | — | 20Mbps |
| ER1-ER3 | Delay Guarantee | 20Mbps | 120msec | 20Mbps |
| ER1-ER3 | Bandwidth Guarantee | 20Mbps | — | 20Mbps |

FIG. 6B

| Section | QoS Class | Bandwidth | Delay | Remaining Bandwodth |
|---------|-----------|-----------|-------|---------------------|
| ER1-ER2 | Delay Guarantee | 20Mbps | 180msec | 18Mbps |
| ER1-ER2 | Bandwidth Guarantee | 20Mbps | — | 20Mbps |
| ER1-ER3 | Delay Guarantee | 20Mbps | 120msec | 20Mbps |
| ER1-ER3 | Bandwidth Guarantee | 20Mbps | — | 20Mbps |

FIG. 7A

| Section | QoS Class | Bandwidth | Delay | Remaining Bandwodth |
|---------|-----------|-----------|-------|---------------------|
| ER5-ER4 | Delay Guarantee | 20Mbps | 180msec | 20Mbps |
| ER5-ER4 | Bandwidth Guarantee | 20Mbps | — | 20Mbps |

FIG. 7B

| Section | QoS Class | Bandwidth | Delay | Remaining Bandwodth |
|---------|-----------|-----------|-------|---------------------|
| ER5-ER4 | Delay Guarantee | 20Mbps | 180msec | 18Mbps |
| ER5-ER4 | Bandwidth Guarantee | 20Mbps | — | 20Mbps |

FIG. 8

| Section | Resource Manager |
|---|---|
| ER1-ER2 | IP address indicating Resource Manager 1 |
| ER1-ER3 | IP address indicating Resource Manager 1 |
| ER5-ER4 | IP address indicating Resource Manager 2 |

FIG. 9A

| Session ID | Requester | Section, Allocated Resources | |
|---|---|---|---|
| 1 | Mobile Terminal 1 | ER1-ER2, Delay:180msec, Bandwidth:2Mbps | ER5-ER4, Delay:180msec, Bandwidth:2Mbps |
| ... | ... | ... | |

FIG. 9B

| Session ID | Requester | Section, Allocated Resources | |
|---|---|---|---|
| 2 | Mobile Terminal 1 | ER1-ER3, Delay:180msec, Bandwidth:2Mbps | ER5-ER4, Delay:180msec, Bandwidth:2Mbps |
| ... | ... | ... | |

FIG. 9C

| Session ID | Requester | Section, Allocated Resources |
|---|---|---|
| | | |
| ... | ... | ... |

FIG. 10A

| ID | Section | QoS Class | Bandwidth | Delay | Assignment |
|----|---------|-----------|-----------|-------|------------|
|    |         |           |           |       |            |
|    |         |           |           | —     |            |
|    |         |           |           |       |            |
| ⋮  | ⋮       | ⋮         | ⋮         | ⋮     | ⋮          |

FIG. 10B

| ID | Section | QoS Class | Bandwidth | Delay | Assignment |
|----|---------|-----------|-----------|-------|------------|
| R1 | ER1-ER2 | Delay Guarantee | 2Mbps | 180msec |     |
|    |         |           |           |       |            |
|    |         |           |           |       |            |
| ⋮  | ⋮       | ⋮         | ⋮         | ⋮     | ⋮          |

FIG. 10C

| ID | Section | QoS Class | Bandwidth | Delay | Assignment |
|----|---------|-----------|-----------|-------|------------|
| R1 | ER1-ER2 | Delay Guarantee | 2Mbps | 180msec |     |
| R2 | ER1-ER3 | Delay Guarantee | 2Mbps | 180msec |     |
| R3 | ER5-ER4 | Delay Guarantee | 2Mbps | 180msec |     |
| ⋮  | ⋮       | ⋮         | ⋮         | ⋮     | ⋮          |

FIG. 13

| ID | Section | QoS Class | Bandwidth | Delay | Assignment | Start Time of Holding |
|---|---|---|---|---|---|---|
| R1 | ER1-ER2 | Delay Guarantee | 2Mbps | 180msec | | 14:26:30 |
| R2 | ER1-ER3 | Delay Guarantee | 2Mbps | 180msec | | 14:28:10 |
| R3 | ER5-ER4 | Delay Guarantee | 2Mbps | 180msec | | 14:26:30 |
| ... | ... | ... | ... | ... | ... | ... |

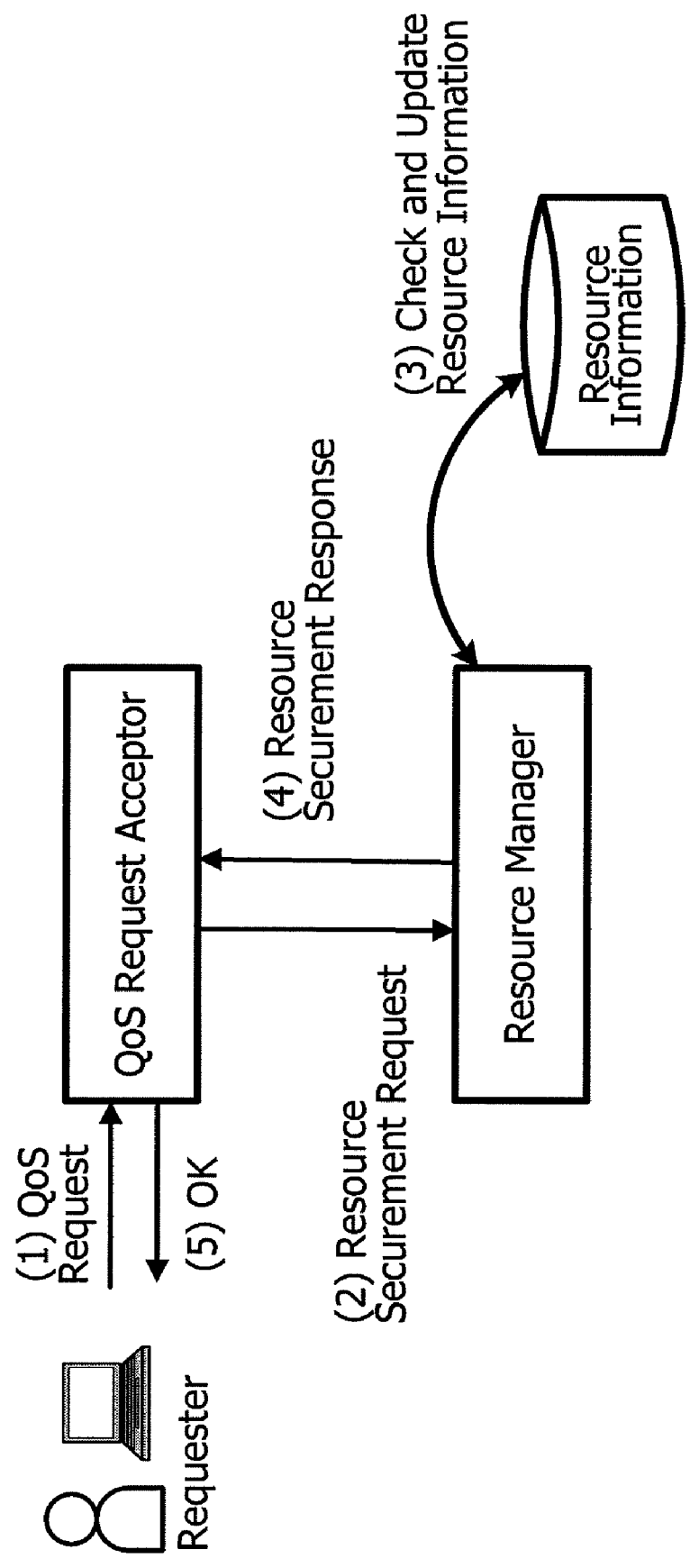

METHOD FOR ACCEPTING QOS REQUEST, AND APPARATUS AND COMPUTER READABLE RECORDING MEDIUM PROVIDING THE SAME

BACKGROUND OF THE INVENTION

1. Field of the Invention

The present invention relates to a method of accepting a QoS request for utilizing resources of a network in a predetermined quality, and an apparatus and a computer readable recording medium providing the method.

2. Description of the Related Art

Recently, in a packet exchange network, the provision of service that guarantees the communication speed quality, such as a bandwidth or a delay characteristic, so-called QoS (quality of service) is being studied. Here, the "packet exchange network" refers to a line network exclusively used for data communications, and owned by a telecommunication carrier. In data communication, a "packet communication" is utilized, in which communication is performed by flexibly selecting a resource without occupying the line. A typical mechanism of guaranteeing a QoS by such a packet exchange network is constituted of a "QoS request acceptor" for accepting a QoS request, and a "resource manager" for managing resources. These QoS request acceptor and resource manager transmit/receive the QoS request or information on resources (resource information), to thereby provide a guarantee service to a requester (e.g., a user terminal or an application server) connecting with the packet exchange network.

SUMMARY

According to an aspect of an embodiment, there is provided a method of accepting a QoS request for utilizing resources of a network in a predetermined quality.

The method comprises: performing a free resource information holding procedure comprising: receiving from a terminal connected to the network a resource unnecessity notification indicating that a resource allocated to the terminal has become unnecessary, and holding, as free resource information, information on a free resource which is a resource notified by the resource unnecessity notification as an unnecessary resource; performing a QoS request determination procedure comprising: receiving the QoS request from the terminal, and determining whether the free resource held by the free resource information holding procedure meets the received QoS request or not on the basis of the free resource information; performing a resource allocation procedure comprising: allocating the free resource to the terminal when the free resource meets the received QoS request, and transmitting information on the allocated free resource to the terminal; and performing a resource manager inquiry procedure comprising: transmitting the received QoS request to a resource manager for managing resources in the network when the free resource does not meet the received QoS request in the determination procedure, receiving from the resource manager information on a resource allocated to the terminal by the resource manager when there is a resource meeting the received QoS request left in the resource manager, and transmitting the information on the allocated resource to the terminal.

BRIEF DESCRIPTION OF THE DRAWINGS

FIGS. 6A and 6B are representations each illustrating an example of a resource information holding part according to an embodiment.

FIGS. 7A and 7B are representations each illustrating an example of the resource information holding part according to an embodiment.

FIG. 8 is a representation illustrating an example of the resource manager information holding part according to an embodiment.

FIGS. 9A to 9C are representations each illustrating an example of the resource information holding part according to an embodiment.

FIGS. 10A to 10C are representations each illustrating an example of a free resource information holding part according to an embodiment.

FIG. 13 is a representation illustrating an example of a free resource information holding part according to an embodiment.

FIGS. 15A and 15B are representations each illustrating a schematic diagram of an example of a procedure providing a QoS guarantee service.

DESCRIPTION OF THE PREFERRED EMBODIMENTS

Figure 1A:
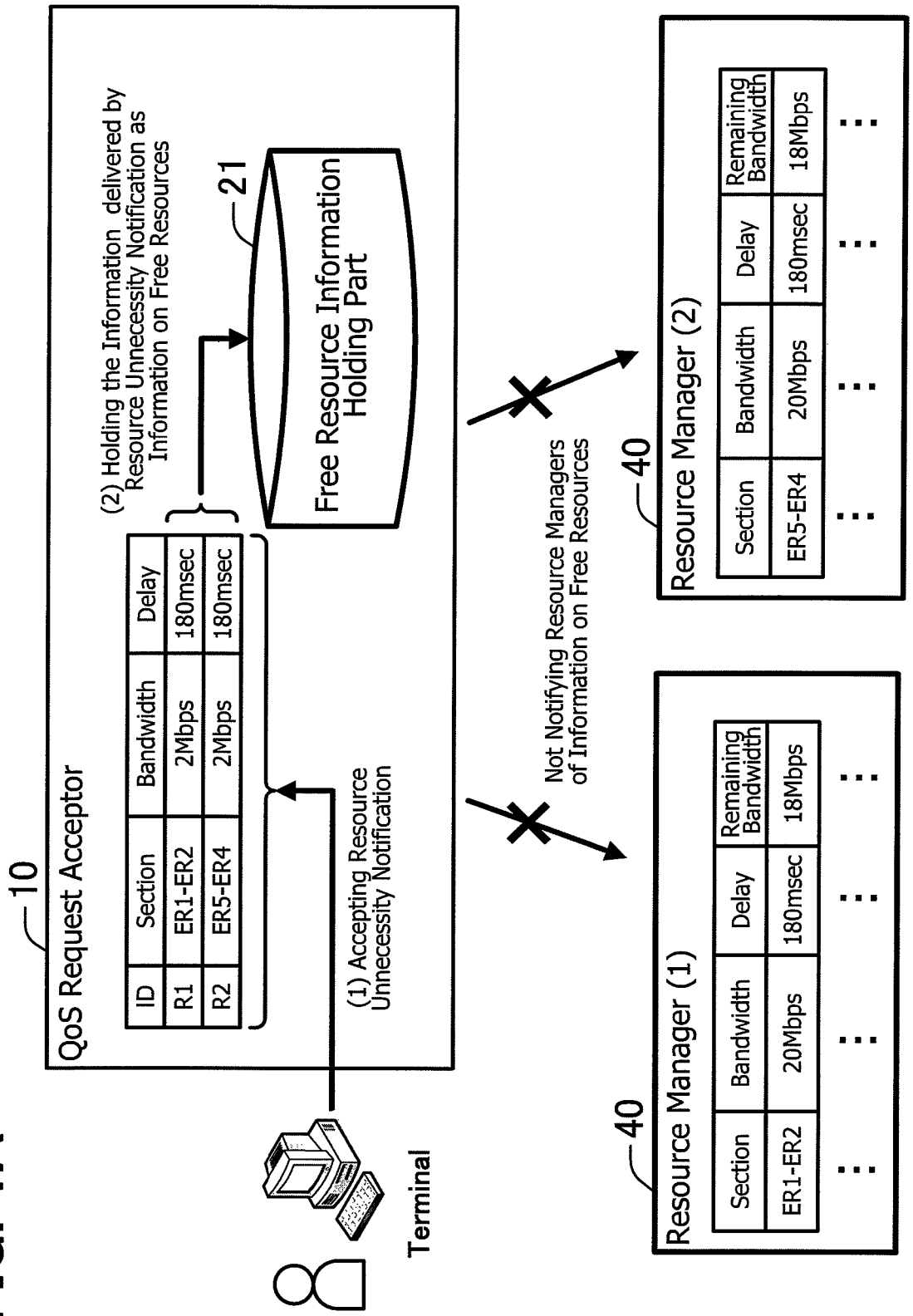
FIGS. 1A and 1B are representations each illustrating the outline and features of a QoS request acceptor according to an embodiment.

Hereinafter, a QoS request acceptance program, a QoS request acceptor, and a QoS request accepting method according to embodiments will be described with reference to the appended drawings. In the descriptions hereinafter, main terminologies used in the embodiments, the outline and features of a QoS request acceptor in a first embodiment, the configuration of a QoS providing system in the first embodiment (here, the QoS providing system is constituted of the QoS request acceptor and the resource manager), processing procedures by the QoS providing system in the first embodiment, and effects of the first embodiment are explained in this order. Other embodiments are subsequently described.

Description of Terminologies

First, main terminologies used in the following embodiments are described. "QoS" is an abbreviation of "Quality of Service". Specifically, "QoS" refers to a service of the side of a line network such as a packet exchange network to guarantee a "communication speed quality" of the line network, to a "terminal" such as the user terminal or an application server connecting with the network.

Here, the "communication speed quality" refers to a "bandwidth" showing a communication speed when the "terminal" performs communications on a network, and/or a "delay characteristic" showing a delay that the "terminal" must tolerate when the "terminal" performs communications on the network. In the network, the "communication speed quality" such as the "bandwidth" or the "delay characteristic" is a matter of serious concern to the "terminal" that transmits/receives various data such as acoustic data or moving image data. The "communication speed quality" must be secured on the part of the network side so as to meet the "QoS request" initially required by the "terminal".

Here, we will discuss how such a "communication speed quality" is secured on the part of the network side. Since the "communication speed quality" depends on a "resource" as a physical network itself, the network side usually manages "bandwidths" or "delay characteristics" for each "resource", and allocates a "resource" to a "terminal" so as to meet a "QoS request" required by the "terminal".

Specifically, a "QoS request acceptor" and a "resource manager" are provided as subordinates of a router on the network side. When the "QoS request acceptor" accepts a "QoS request" designating a "communication speed quality" etc., from a "terminal", it transmits the accepted content to the "resource manager". If there is a resource meeting the "QoS request" left in resources managed by the "resource manager", the "resource manager" allocates the "resource" from the resource left, and the "QoS request acceptor" transmits information (e.g., information on section, bandwidth, delay characteristic etc.) regarding the "resource" allocated by the "resource manager", to the "terminal".

Larger the scale of a network, more difficult will become the above-described provision of the QoS guarantee service. In particular, when allocating a "resource" meeting a "QoS request", the "resource manager" must check or update a vast amount of information on "bandwidths" or "delay characteristics" managed for each "resource". As the scale of the network becomes large, these check or update becomes complicated, so that the resource allocation requires a lot of time. Therefore, the crucial point herein is how the QoS request acceptor according to the embodiment reduces the time necessary for resource allocation.

Figure 15B:
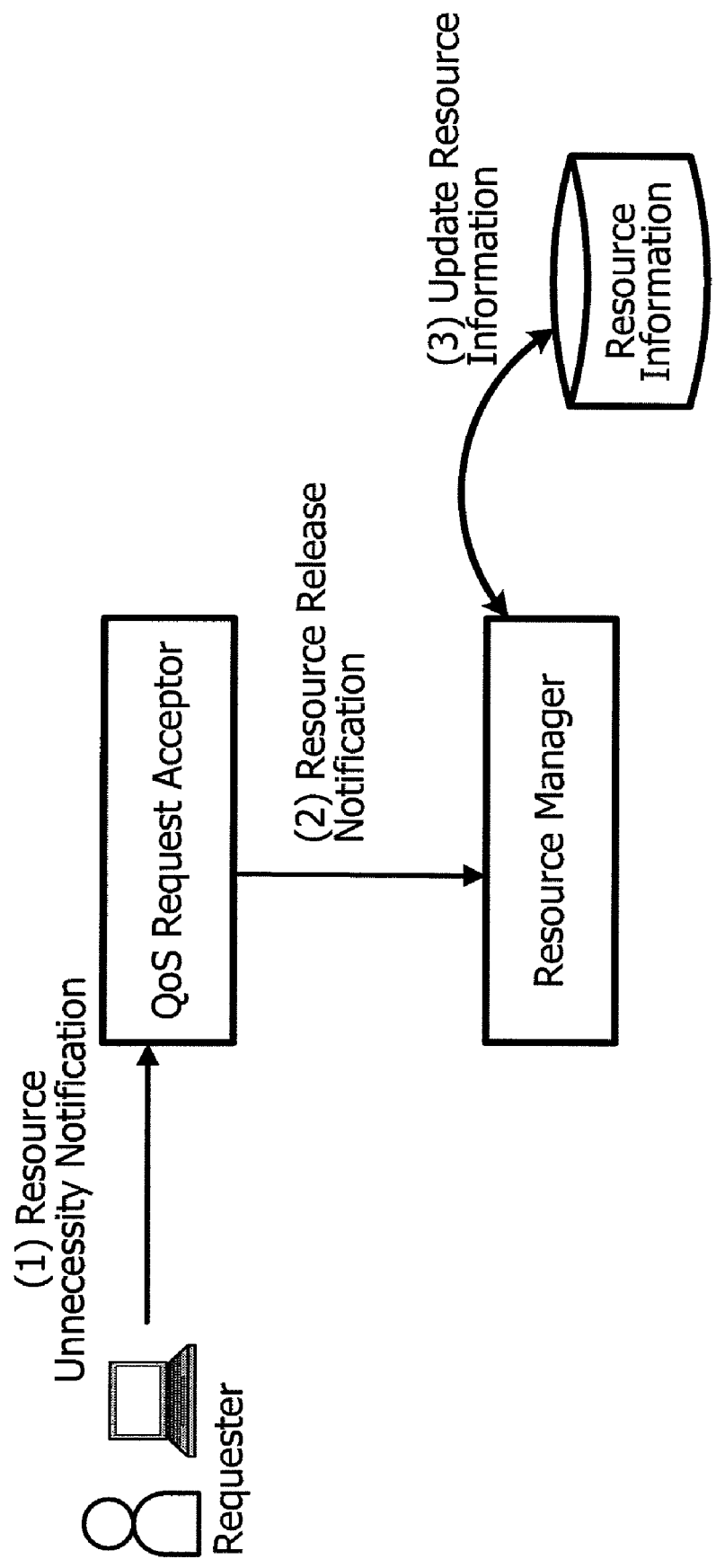

FIGS. 15A and 15B are representations each illustrating a schematic diagram of a procedure of providing a QoS guarantee service.

First, as shown in FIG. 15A, the QoS request acceptor accepts a QoS request from the requester (refer to (1) in FIG. 15A). Next, for the purpose of allocating a resource meeting the QoS request to the requester, the QoS request acceptor transmits a resource securement request to the resource manager (refer to (2) in FIG. 15A). Thereupon, the resource manager checks whether there exists a resource meeting the QoS request. If it exists, the resource manager performs processing necessary for the allocation of a resource, such as the updating of resource information under management, (refer to (3) in FIG. 15A), and returns a resource securement response to the QoS request acceptor (refer to (4) in FIG. 15A). Thereupon, the QoS request acceptor grasps, based on the response of the resource manager, whether a resource can be allocated to the requester, and returns a response to the requester on the basis of the grasped content (refer to (5) in FIG. 15A).

As shown in FIG. 15B, when the QoS request acceptor accepts a resource unnecessity notification that a resource has become unnecessary, from the requester (refer to (1) in FIG. 15B), it transmits a resource release notification to the resource manager (refer to (2) in FIG. 15B). Then, the resource manager performs processing necessary for the release of resource, such as the updating of resource information under management (refer to (3) in FIG. 15B).

In such a QoS guarantee service, the QoS request acceptor or the resource manager must ensure that the requester can utilize a resource in the communication speed quality accepted in response to the QoS request. In other words, the resource manager must manage resources of the network, and must grasp resources that are actually being utilized. Also, when attempting to allocate a resource, the resource manager must check whether there is a resource meeting the QoS request. Furthermore, because the resource manager must avoid double booking that may occurs when a plurality of QoS requests are simultaneously accepted, the resource manager must identify resources one by one sequentially when attempting to allocate resources. For example, in the method disclosed in Japanese Unexamined Patent Application Publication No. 2004-241835, every time a QoS request (call) from a requester is accepted, it is checked on which path the call passes, and for each link constituting the path, it is checked whether a burst continuation time does not exceed an upper limit thereof.

Figure 16:
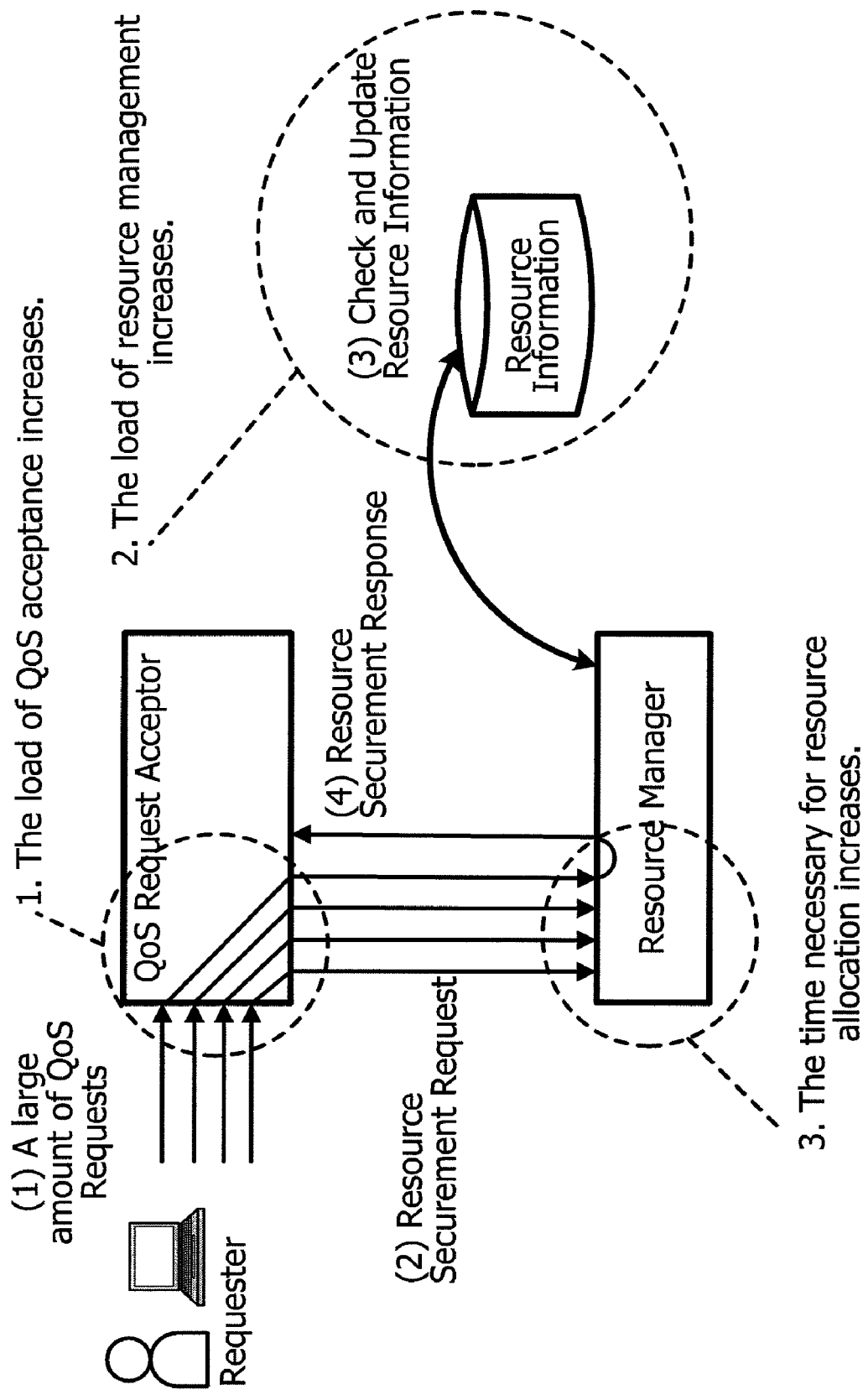
FIG. 16 is a representation illustrating a schematic diagram of a procedure providing a QoS guarantee service in the case of a large-scaled packet exchange network in which a large mount of QoS requests occur.

As shown in FIG. 16, in a large-scaled packet exchange network in which a large mount of QoS requests occur, when the QoS guarantee service described above is provided, the load of QoS request acceptance in the QoS request acceptor increases because the number of QoS requests increases (refer to 1 in FIG. 16). Also, in the resource manager, since the number of resources to be managed increases, the load of resource management increases (refer to 2 in FIG. 16). Furthermore, since the time required for the allocation of resources in the resource manager increases, the standby time in the QoS request acceptor increases, and on a whole, the time necessary for resource allocation increases (refer to 3 in FIG. 16).

Figure 17:
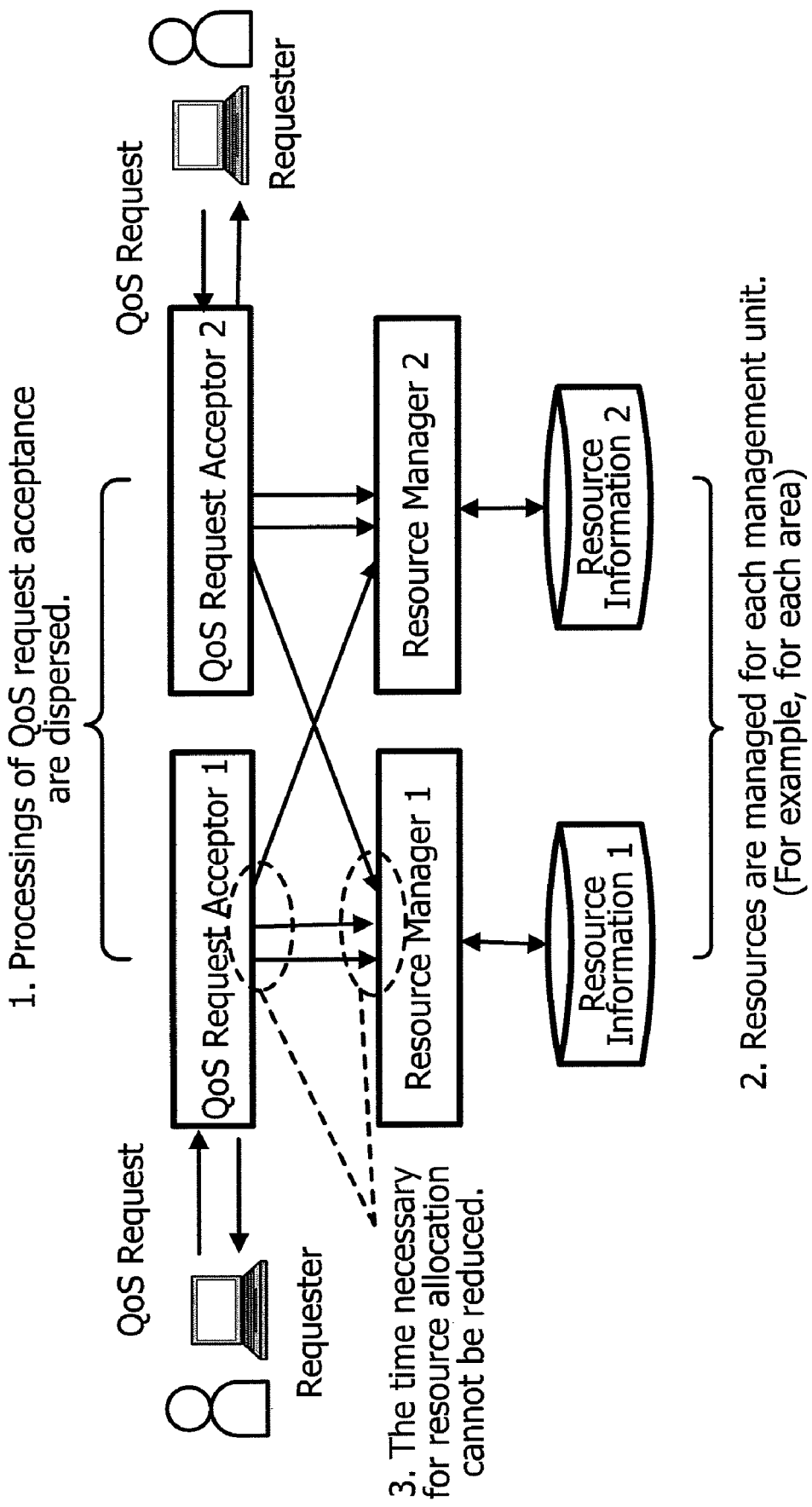
FIG. 17 is a representation illustrating a schematic diagram of a procedure providing a QoS guarantee service where a plurality of QoS request acceptors are arranged to disperse processing of QoS request acceptance, so as to reduce the load of QoS request acceptance in the QoS request acceptor.

With this being the situation, typically, as shown in FIG. 17, a plurality of QoS request acceptors are arranged to disperse processing of QoS request acceptance, whereby the load of QoS request acceptance in the QoS request acceptor is reduced. Moreover, a plurality of QoS resource managers are arranged, and resources are divided into a plurality of management units (for example, a plurality of areas) so that the resource manager can manage resources for each management unit, whereby the load in resource management in the resource manager is reduced.

However, in the above-described technique, there is a problem that, even though the load of QoS request acceptance or the load of resource management can be reduced, the time necessary for resource allocation cannot be reduced. Specifically, providing a plurality of QoS request acceptors and a plurality of resource managers does not allow the reduction in the time necessary for resource allocation. If a QoS request is a request for communications across a plurality of areas for example, the QoS request acceptor must check resource allocation with a plurality of resource managers, so that the time necessary for resource allocation may increase rather than decrease.

Such a problem of being incapable of reducing the time necessary for resource allocation remains as a task even when a single QoS request acceptor and a single resource manager are provided, not to mention when a plurality of QoS request acceptors and a plurality of resource managers are provided.

Figure 1B:
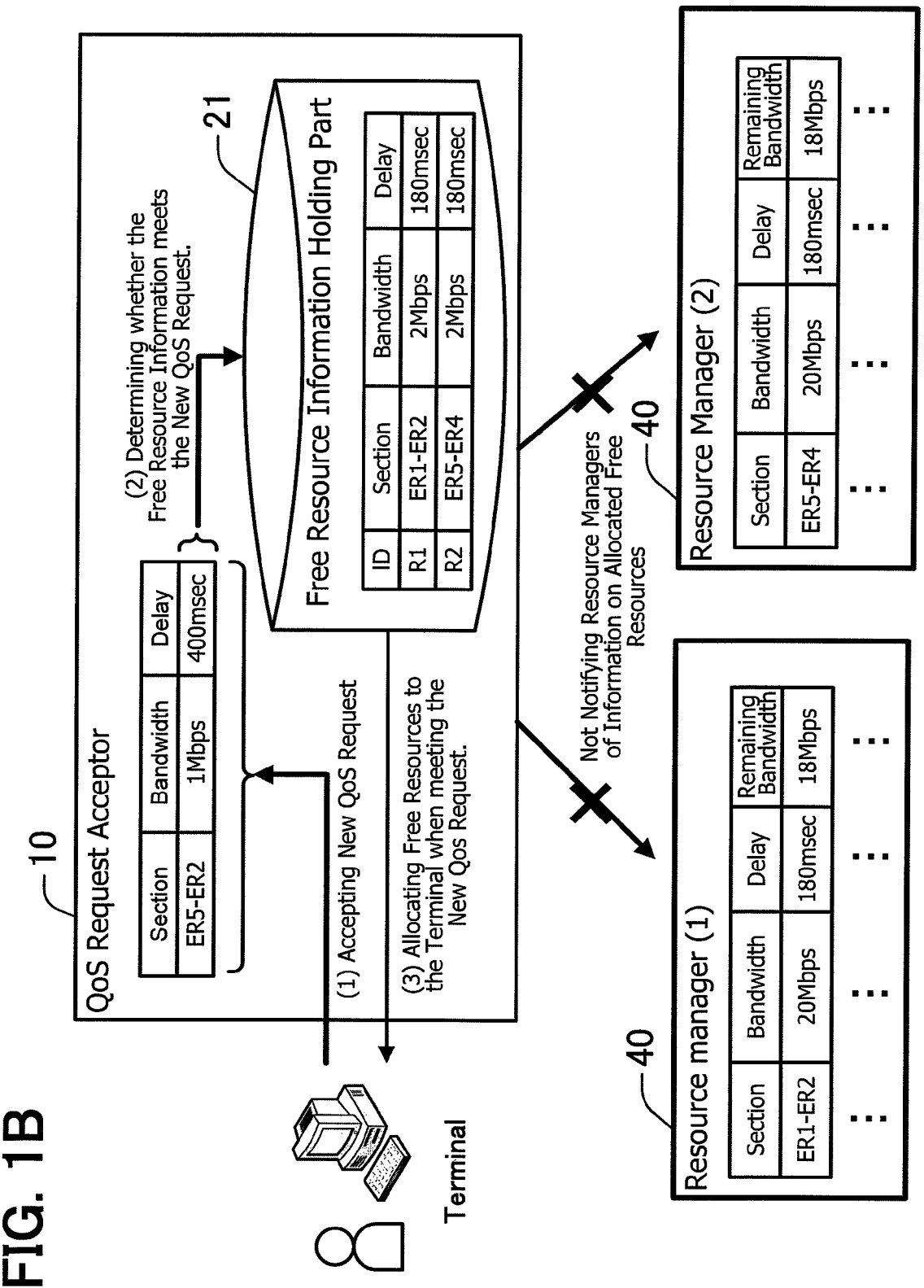

Next, the outline and features of the QoS request acceptor according to the first embodiment will be described with reference to FIGS. 1A and 1B. FIGS. 1A and 1B are representations each illustrating the outline and features of the QoS request acceptor 10 according to the first embodiment. In the embodiment shown hereafter, the entirety of QoS providing system constituted of the QoS request acceptor 10 and the resource manager 40 is described. Also, in the embodiment shown hereafter, the description is made of a case where the QoS request acceptor 10 and the resource manager 40 are realized by mutually different devices, but the embodiment is not limited to this case. The embodiment is also applicable to a case where the QoS request acceptor 10 and the resource manager 40 are implemented by the same device.

As described above, the outline of the QoS request acceptor 10 according to the first embodiment is to accept a QoS request requiring the utilization of a resource with a predetermined communication speed quality, from a terminal connecting with the network and allocate the resource to a terminal. The chief features of the QoS request acceptor 10 is to reduce the time necessary for resource allocation and to process the QoS request acceptance at a high speed.

Here, a brief explanation on the chief features is provided. As shown in FIGS. 1A and 1B, the QoS providing system in the first embodiment is constituted of the QoS request acceptor 10 and the resource manager 40 according to the embodiment. In the first embodiment, the resource manager 40 is divided into a resource manager 40 (1) and a resource manager 40 (2). This is because, as described in detail later, the first embodiment is premised upon that there are provided a plurality of resource managers, and that resources are divided into a plurality of management units (e.g., resources are divided for each area) so that the resource manager manages resources for each management unit.

For example, as shown in FIG. 1, the resource manager 40 (1) manages a resource in an section "ER1-ER2", and the resource manager 40 (2) manages a resource in an section "ER5-ER4".

In the exemplification in FIGS. 1A and 1B, a state is assumed in which the QoS providing system has been allocated a resource that already exists, to a terminal. That is, as shown in FIG. 1A, a state is assumed in which a bandwidth "2 Mbps" and a delay "180 msec" as a resource (ID[R1]) regarding the section "ER1-ER2", and a bandwidth "2 Mbps" and a delay "180 msec" as a resource (ID[R2]) regarding the section "ER5-ER4" have been allocated to the terminal that already exists.

On the other hand, resources managed by the resource manager 40 (1) and the resource manager 40 (2) are specifically described below. In the exemplification in FIG. 1A, the resource manager 40 (1) manages a bandwidth "20 Mbps", a delay "180 msec", and a remaining bandwidth "18 Mbps" as a resource regarding the section "ER1-ER2". This indicates that the physical bandwidth of the resource regarding the section "ER1-ER2" is "20 Mbps", that the delay characteristic is not more than "180 msec", and that a free bandwidth that has not been used by any terminal is "18 Mbps". As described above, in the exemplification in FIG. 1A, since the QoS providing system has already allocated the bandwidth "2 Mbps" and the delay "180 msec" as the resource (ID[R1]) regarding the section "ER1-ER2" to a certain terminal, the remaining bandwidth managed by the resource manager 40 (1) has become "18 Mbps". In other words, if a "QoS request" is one that requires a bandwidth of not more than "18 Mbps" regarding the section "ER1-ER2", and that tolerates a delay characteristic of not less than "180 msec", the resource manager 40 (1) allocates a resource. The same goes for the resource manager 40 (2).

Under such a configuration, the QoS request acceptor 10 according to the first embodiment firstly accepts, from a terminal, a resource unnecessity notification notifying that resources allocated based on information on the resources have become unnecessary (refer to (1) in FIG. 1A). For example, the QoS request acceptor 10 accepts, from the terminal, a resource unnecessity notification notifying that a resource of the bandwidth "2 Mbps" and the delay "180 msec" as the resource (ID [R1]) regarding the section "ER1-ER2", and a resource of the bandwidth "2 Mbps" and the delay "180 msec" as the resource (ID [R2]) regarding the section "ER5-ER4" have become unnecessary.

Thereupon, the QoS request acceptor 10 holds the information on the resources delivered by the resource unnecessity notification, as information on free resources that have not been used by any terminal (refer to (2) in FIG. 1A). For example, the QoS request acceptor 10 holds the information on the resources ID [R1] and ID [R2] in the free resource information holding part, as information on the resources delivered by the resource unnecessity notification (refer to the free resource information holding part 21 in FIG. 1B).

At this time, the QoS request acceptor 10 according to the first embodiment needs not notify the resource manager 40 (1) and the resource manager 40 (2) that the information on the resources ID [R1] and ID [R2] has become unnecessary for the terminal.

Next, the QoS request acceptor 10 according to the first embodiment accepts a new QoS request from any terminal connecting with the network (refer to (1) in FIG. 1B). For example, the QoS request acceptor 10 accepts a new request requiring for a bandwidth "1 Mbps" and a delay "400 msec" as a resource regarding the section "ER5-ER2".

Then, the QoS request acceptor 10 determines whether the resources allocated based on the information on the free resources held by the free resource information holding part 21 meet the new QoS request (refer to (2) in FIG. 1B). For example, the QoS request acceptor 10 determines that the resources allocated based on the information on the free resources meet the new QoS request, on the conditions that the bandwidth "2 Mbps" of the resource allocated based on the information on the free resources is not less than the bandwidth "1 Mbps" required by the new QoS request, and that the total delay "180 msec+180 msec=360 msec" of the resources allocated based on the information on the free resources is not more than the delay "400 msec" required by the new QoS request.

If it is determined that the resources allocated based on the information on the free resources meet the new QoS request, the QoS request acceptor 10 transmits the information on the free resources to a terminal that has required the new QoS request, and allocates the free resources to the terminal as resources meeting the new QoS request (refer to (3) in FIG. 1B). For example, the QoS request acceptor 10 transmits information on resources ID [R1] and ID [R2] as the information on the free resources, to the terminal that has required the new QoS request, and the QoS request acceptor 10 allocates the resource of the bandwidth "2 Mbps" and the delay "180 msec" as a resource (ID [R1]) regarding the section "ER1-ER2", and the resource of the bandwidth "2 Mbps" and the delay "180 msec" as a resource (ID [R2]) regarding the section "ER5-ER4", to the terminal, taking them as resources meeting the new QoS request.

At this time also, the QoS request acceptor 10 needs not notify the resource manager 40 (1) and the resource manager

40 (2) that the QoS request acceptor 10 has allocated the resources ID [R1] and ID [R2] to the terminal. If it is determined that the resources allocated based on the information on free resources do not meet the new QoS request, the QoS request acceptor 10, for example, transmits a new QoS request to the resource manager 40 to require resource allocation by the resource manager 40.

Thus, the QoS request acceptor 10 allows a reduction in the time necessary for resource allocation and high speed processing of QoS request acceptance.

In the foregoing descriptions, for convenience of explaining, a method for designating the section of a resource (e.g., "ER5-ER2") when a terminal requires a QoS request, has been explained. However, in actuality, the QoS request acceptor 10 can applies various methods in response to actual conditions of operation. For example, the terminal can be merely operative to designate a communications partner besides making request for the communication speed quality and the like, to find out a resource section(s).

Figure 2:
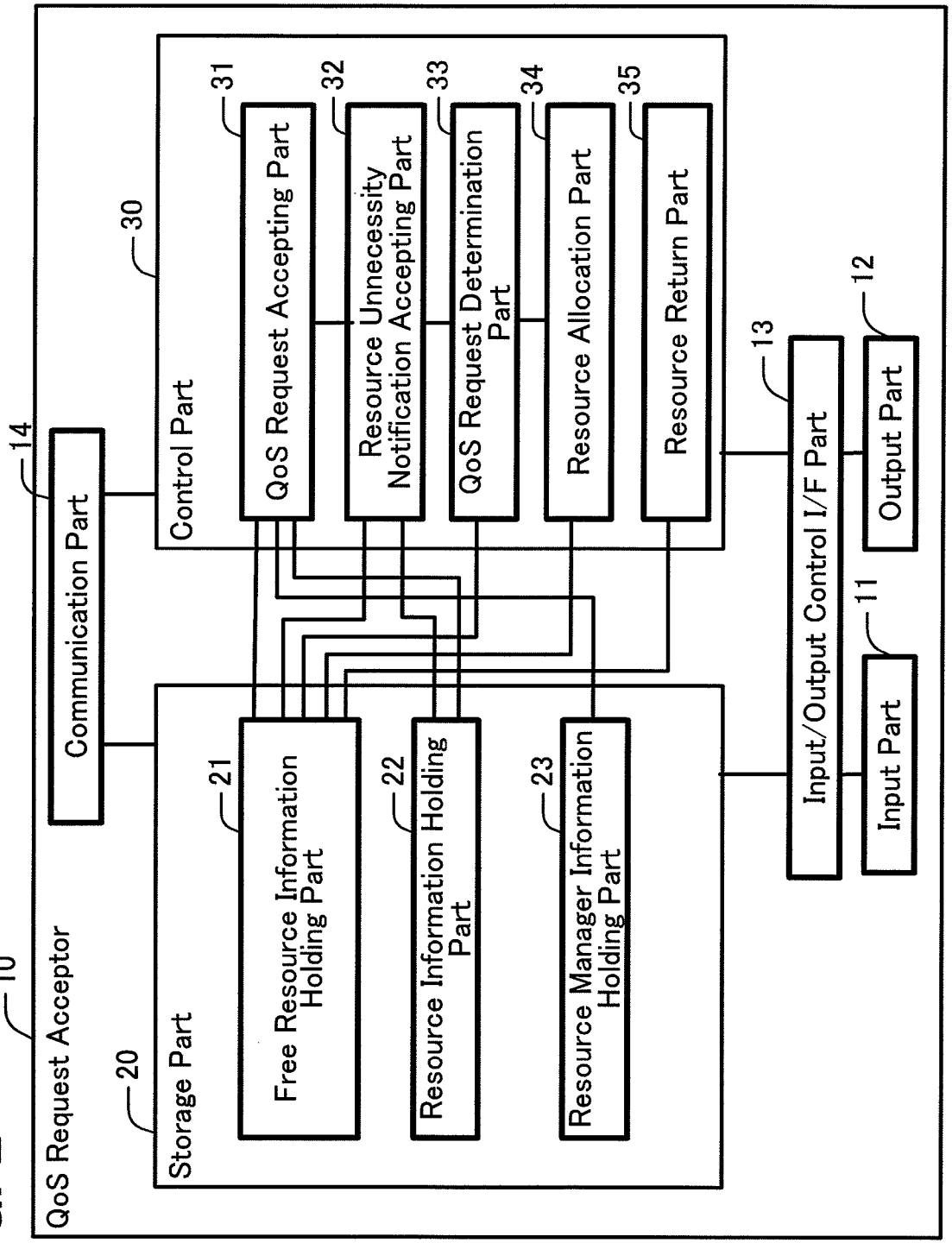
FIG. 2 is a block diagram illustrating an example of a configuration of the QoS request acceptor according to an embodiment.
Figure 3:
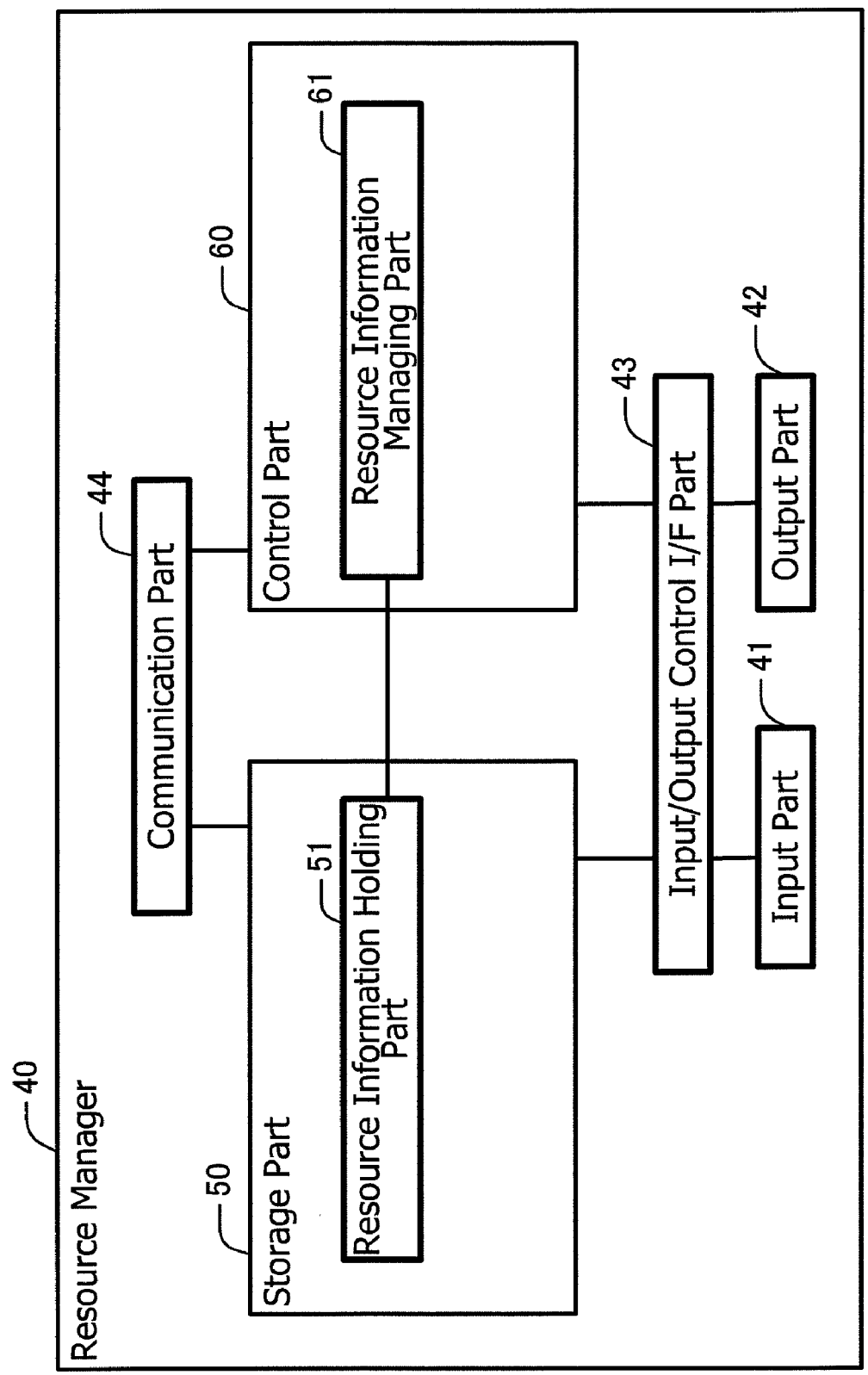
FIG. 3 is a block diagram illustrating an example of a configuration of a resource manager according to an embodiment.
Figure 4:
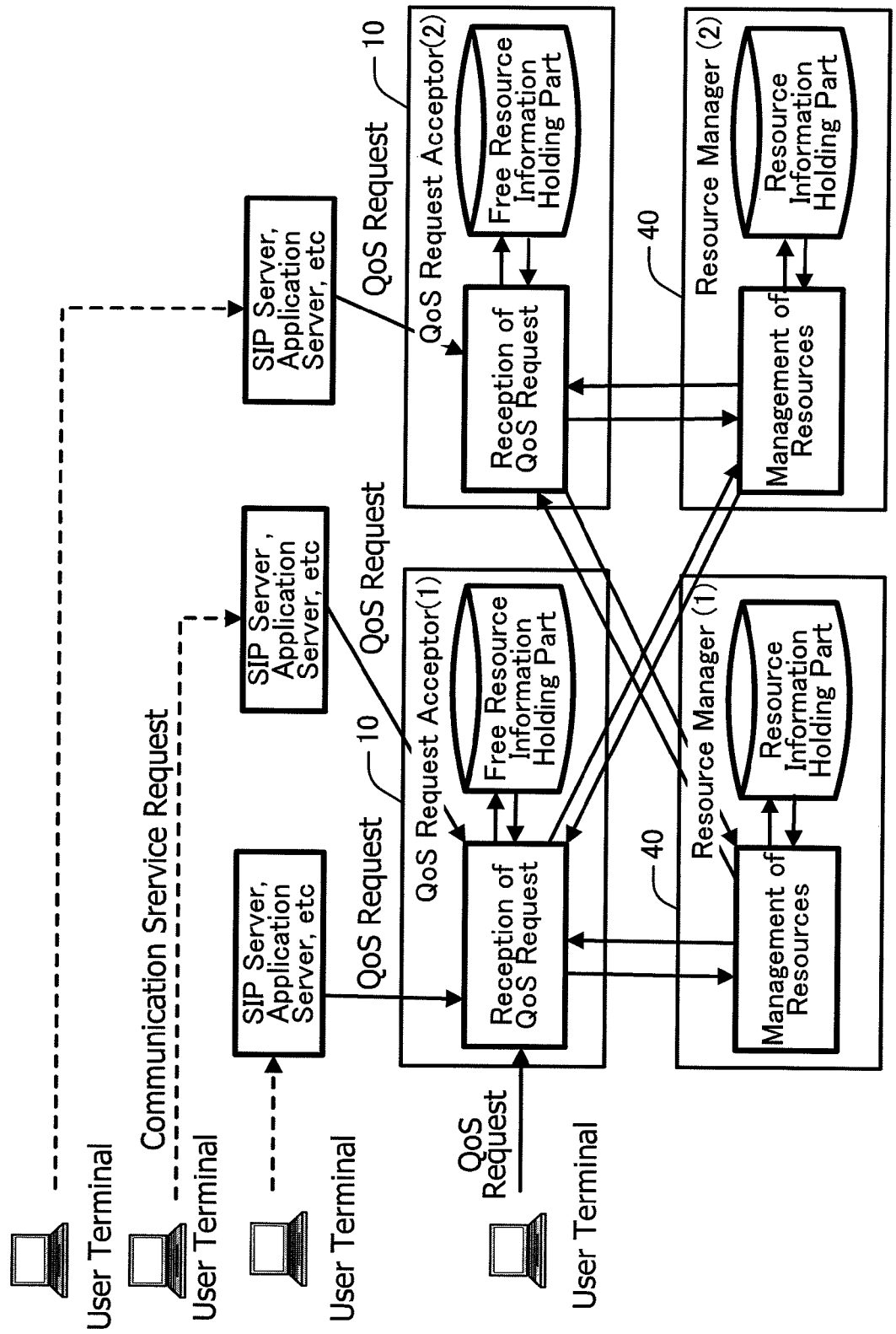
FIG. 4 is a representation illustrating an example of an overall configuration according to an embodiment.
Figure 5:
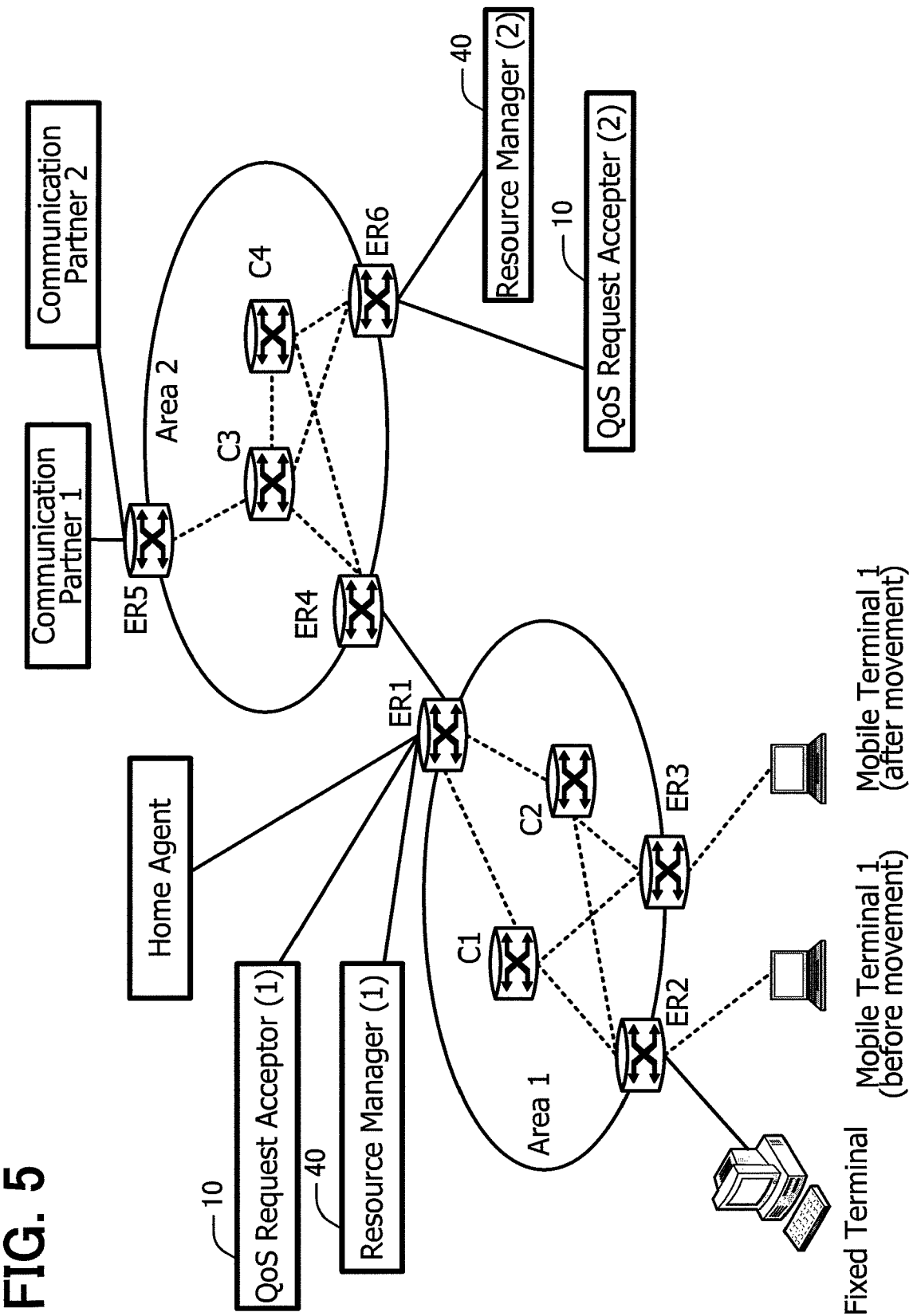
FIG. 5 is a representation illustrating an example of a network configuration according to an embodiment.

Next, the configuration of the QoS providing system in the first embodiment will be described with reference to FIGS. 2 to 10. FIG. 2 is a block diagram illustrating the configuration of the QoS request acceptor 10 according to the first embodiment; FIG. 3 is a block diagram illustrating the configuration of a resource manager according to the first embodiment; FIG. 4 is a representation illustrating an example of the overall configuration in the first embodiment; FIG. 5 is a representation illustrating an example of a network configuration in the first embodiment; FIGS. 6A and 6B, and FIGS. 7A and 7B are representations each illustrating an example of a resource information holding part; FIG. 8 is a representation illustrating an example of the resource information holding part in the resource manager; FIGS. 9A to 9C are representations each illustrating an example of the resource information holding part; and FIGS. 10A to 10C are representations each illustrating an example of a free resource information holding part.

First, the configuration of the QoS request acceptor 10 constituting the QoS providing system in the first embodiment will be briefly described with reference to FIG. 2. As shown in FIG. 2, the QoS request acceptor 10 includes an input part 11, an output part 12, an input/output control I/F part 13, a communications part 14, a storage part 20, and a control part 30. The storage part 20 is means for storing data used for various processings by the control part 30. As shown in FIG. 2, as ones that are particularly closely related to the embodiment, the storage part 20 includes a free resource information holding part 21, a resource information holding part 22, and a resource manager information holding part 23.

The control part 30 is means for controlling the QoS request acceptor 10 to execute various processings. As shown in FIG. 2, as ones that are particularly closely related to the embodiment, the control part 30 includes a QoS request accepting part 31, a resource unnecessity notification accepting part 32, a QoS request determination part 33, resource allocation part 34, and resource Return part 35. These parts constituting the QoS request acceptor 10 will be explained in detail later.

Next, the configuration of the resource manager constituting the QoS providing system is briefly described with reference to FIG. 3. As shown in FIG. 3, the resource manager 40 includes an input part 41, an output part 42, an input/output control I/F part 43, a communications part 44, a storage part 50, and a control part 60. Here, the storage part 50 is means for storing data used for various processings by the control part 60, and as shown in FIG. 3, includes a resource information holding part 51, as one that is particularly closely related to the present. Also, the control part 60 is means for controlling the resource manager 40 to execute various processing, and as shown in FIG. 3, includes a resource information managing part 61, as one that is particularly closely related to the embodiment. These parts constituting the resource manager 40 will be explained in detail later.

Then, the overall configuration of the QoS providing system according to the first embodiment will be described with reference to FIG. 4. As shown in FIG. 4, the QoS providing system includes a plurality of QoS request acceptors 10 to disperse proceedings of QoS request acceptance, thereby reducing the load of QoS request acceptance in the QoS request acceptors. Also, as shown in FIG. 4, the QoS providing system includes a plurality of resource managers 40, and divides resources into a plurality of management units (e.g., divides resources for each area) to manage resources for each management unit, thereby reducing the load of resource management in the resource managers 40. In the first embodiment, the description is made of a case where the QoS providing system includes a plurality of QoS request acceptors 10 and a plurality of resource managers 40, but the embodiment is not limited to this case. The embodiment is also applicable to a case where the QoS providing system includes a single QoS request acceptor and a single resource manager.

Here, the configuration of the network in the first embodiment is explained with reference to FIG. 5. As shown in FIG. 5, the network in the first embodiment includes two areas: an area 1 constituted of edge routers "ER1" to "ER3", and core routers "C1" and "C2"; and an area 2 constituted of edge routers "ER4" to "ER6", and core routers "C3" and "C4". Here, this network configuration is based upon a premise that, in a link between the "ER1" and "ER4", there is a sufficient bandwidth as well as the delay is negligibly small.

It is also assumed that, in the "ER1", a QoS request acceptor 10 (1) and a resource manager 40 (1) each of which targets the area 1, are connected, and that, in the ER6, a QoS request acceptor 10 (2) and a resource manager 40 (2) each of which targets the area 2, is connected. Furthermore, in the first embodiment, because a "terminal" is premised upon using a mobile terminal utilizing a mobile IP protocol, communications by the "terminal" is performed on a route via a "home agent" connecting to the "ER1". Although, in the first embodiment, the "terminal" is premised on being the mobile terminal utilizing a mobile IP protocol, the embodiment is not limited to this terminal. For example, as shown in FIG. 5, the embodiment is also applicable to a case where the "terminal" is premised on being a "fixed terminal" connecting to the "ER2".

Hereinafter, detailed descriptions will be given on the function of each part of the QoS request acceptors 10 and the resource managers 40, which are premised on the overall configuration and the network configuration as described above. For convenience of explanation, descriptions are made in the order of the function of each part of the resource manager 40, and the function of each part of the QoS request acceptor 10.

Referring back to FIG. 3, the resource manager 40 in the first embodiment is a device that manages resources of the network, and that, upon acceptance of a QoS request from a terminal via the QoS request acceptor 10, allocates a resource to the terminal out of resources under management, so as to transmit information on the allocated resource to the QoS request acceptor 10. However, the resource manager 40 in the embodiment is not one that accepts all QoS requests to allocate resources, but is one that allocates a resource only regarding a QoS request as to which no resource has been allocated by the QoS request acceptor 10.

The input part 41 inputs data used for various processings by the control part 60, operation instructions for various processings or the like through a keyboard, a mouse, a recording medium, or the like. For example, the input part 41 inputs information on a resource of the network through the keyboard or the like, and the inputted information on the resource is held by the resource information holding part 51 to be described later.

The output part 42 outputs results of various processings by the control part 60, operation instructions for various processings, or the like onto a monitor, printer, or the like. For example, the output part 42 outputs the information on the resource held by the resource information holding part 51 onto the monitor or the like. The outputted information on the resource is checked by an operator who operates the resource manager 40, or the like.

The input/output control I/F part 43 controls data transfers between each of the input part 41 and the output part 42, and each of the storage part 50 and the control part 60.

The communication part 44 has a typical library for communications, and performs communications between the resource manager 40 and each of the QoS request acceptor 10, the router and the like. For example, the communication part 44 receives a QoS request transmitted from a terminal via the QoS request acceptor 10. The received QoS request is utilized, e.g., in processing by the resource information managing part 61 to be described later. Also, for example, the communication part 44 transmits information on a resource allocated to the terminal by the resource information managing part 61, to the QoS request acceptor 10.

The resource information holding part 51 holds information on resources of the network. Specifically, the resource information holding part 51 holds information on a resource inputted by the input part 41. The held information on the resource is utilized for proceeding by the resource information managing part 61 to be described later.

For example, the resource information holding part 51 holds information on resources as shown in FIGS. 6A and 6B, and FIGS. 7A and 7B. In the first embodiment, the resource manager 40 manages resources in the area 1 and resources in the area 2 by the resource manager 40 (1) and the resource manager 40 (2), respectively. FIGS. 6A and 6B are representations illustrating examples of the resource information holding part 51 of the resource manager 40 (1) managing resources in the area 1, and FIGS. 7A and 7B are representations illustrating examples of the resource information holding part 51 of the resource manager 40 (2) managing resources in the area 2.

For example, as shown in FIG. 6A, the resource information holding part 51 of the resource manager 40 (1) manages resources of the section "ER1-ER2" and resources of the section "ER1-ER3", as resources of the area 1. For each of the sections, the resource manager 40 (1) manages resources of QoS class "delay guarantee" and "bandwidth guarantee". To explain more specifically by an example, as shown in the first line in FIG. 6A, the resource information holding part 51 manages, in the area 1, the physical bandwidth being 20 Mbps and the delay being not more than 180 msec, as a resource of QoS class "delay guarantee" in the section "ER1-ER2", and also manages the free bandwidth at which such a resource has not been used by any terminal being "20 Mbps". Although the above-described notation section "ER1-ER2" is used here for convenience of explanation, this notation does not limit the direction of communication. This notation includes being used in the case of a resource for communications in the directions of both "ER1→ER2" and "ER2→ER1".

It is considered to be ordinary that the resource information holding part 51 holds information on resources of the network as described above by the time when a QoS guarantee service is fully provided in the network. That is, by the time when the QoS guarantee service is fully provided, the information on resources are inputted into the resource manager 40 by an operator who operates the network or an operator who operates the resource manager 40, and the resource information holding part 51 holds the information on resources. Supposing the information on resources thus held by the resource information holding part 51 is information shown in FIG. 6A, information shown in FIG. 6B would be an example of information on resources to be held by the resource information holding part 51 after the QoS guarantee service has started to be fully provided in the network.

For example, as shown in the first line in FIG. 6B, the resource information holding part 51 of the resource manager 40 (1) manages, in the area 1, the physical bandwidth being 20 Mbps, and the delay being not more than 180 msec, as a resource of QoS class "delay guarantee" in the section "ER1-ER2", and also manages the free bandwidth at which such a resource has not been used by any terminal being "18 Mbps". That is, as compared with the first line in FIG. 6A, the information on free bandwidth has changed from "20 Mbps" to "18 Mbps". This shows that the information on resources managed by the resource information holding part 51 of the resource manager 40 (1) has made a change since a resource has been allocated to a terminal by the resource information managing part 61 to be described later after the QoS guarantee service has started to be fully provided in the network.

Moreover, for example, when the configuration of the network makes a change and the information on resources of the network makes a change, the information on resources managed by the resource information holding part 51 also makes a change. In other words, the resource information holding part 51 dynamically holds information on resources reflecting the current situation, as information on resources of the network. Although descriptions regarding FIGS. 7A and 7B are omitted here, the resource information holding part 51 of the resource manager 40 (2) also manages resources in the area 2.

Upon acceptance of a QoS request from a terminal via the QoS request acceptor 10, the resource information managing part 61 allocates a resource to the terminal out of resources under management, and transmits information on the allocated resource to the QoS request acceptor 10. However, as described above, the resource manager 61 in the embodiment is not one that accepts all QoS requests to allocate resources, but is one that allocates a resource only regarding a QoS request as to which no resource has been allocated by the QoS request acceptor 10.

Specifically, upon acceptance of the QoS request from the terminal via the QoS request acceptor 10, the resource information managing part 61 determines, based on the information on resources held by the resource information holding part 51, whether there is a resource meeting the QoS request left. If there is a resource meeting the QoS request left, the resource information managing part 61 acquires information on the resource to be allocated to the terminal from the resource information holding part 51, and upon updating the information of the resource information holding part 51, transmits the information on the resource to the QoS request acceptor 10.

For example, when the resource information managing part 61 accepts a QoS request for resource of the section "ER1-ER2", a bandwidth "2 Mbps", a delay "within 400 msec", from the terminal, the resource information managing part 61 determines, based on the information on resources held by the resource information holding part 51 as shown in FIG. 6A, whether there is a resource meeting the QoS request left. Since this case is one where there is a resource bandwidth "20 Mbps" left as shown in the first line in FIG. 6A, the resource information managing part 61 acquires information on the resource to be allocated to the terminal, from the resource information holding part 51, and upon updating the information of the resource information holding part 51 as shown in FIG. 6B, the resource information managing part 61 transmits the information on the resource to the QoS request acceptor 10.

Referring back to FIG. 2, the QoS request acceptor 10 in the first embodiment is a device that accepts a QoS request from a terminal, and that, upon acceptance of the QoS request from the terminal, transmits information on a resource to be allocated to the terminal, to the terminal. The QoS request acceptor 10 in the embodiment does not transmit the QoS request to the resource manager 40 immediately after it has accepted the QoS request from the terminal, but the QoS request acceptor 10 determines whether a resource existing in a resource cache (corresponding to the free resource information holding part 21) provided in the QoS request acceptor 10 meets the QoS request. If it is determined that the resource meets the QoS request, the QoS request acceptor 10 allocates the resource existing in the resource cache to the terminal.

The input part 11 inputs data used for various processings by the control part 30, operation instructions for various processings or the like through a keyboard, a mouse, a recording medium, or the like. For example, the input part 11 inputs an IP address indicating the resource manager 40 through the keyboard or the like, and the inputted IP address is held by the resource manager information holding part 23 to be described later.

The output part 12 outputs results of various processings by the control part 30, operation instructions for various processings, or the like onto a monitor, printer, or the like. For example, the output part 12 outputs information on the information on resources held by the resource information holding part 22 onto the monitor or the like. The outputted information on resources can be checked by an operator who operates the QoS request acceptor 10.

The input/output control I/F part 13 controls data transfers between each of the input part 11 and the output part 12, and each of the storage part 20 and the control part 30.

The communication part 14 has a typical library for communications, and performs communications with terminals, the resource manager 40, and the router, or the like. For example, the communications part 14 receives a QoS request transmitted from a terminal. The received QoS request is utilized, e.g., in processing by the QoS request accepting part 31 to be described later. Also, for example, the communication part 14 transmits information on a resource allocated to the terminal by the resource allocation part 34, to the terminal.

The resource manager information holding part 23 holds information on resource sections managed by each of the resource managers 40 and IP addresses of each of the resource managers 40, as information on the resource managers 40. Specifically, the resource manager information holding part 23 holds information on the resource manager 40 inputted by the input part 11. The held information on the resource manager 40 is utilized in processing by the QoS request accepting part 31 (e.g., utilized when the QoS request acceptance 31 transmits a resource securement request to the resource manager 40).

For example, as shown in FIG. 8, the resource manager information holding part 23 holds information on sections and the IP addresses indicating the resource manager 40 in relation to each other.

The resource information holding part 22 holds information on a resource that has actually allocated to a terminal, regarding a QoS request that has been accepted by the QoS request acceptor 10. Specifically, in either of the cases where a resource is allocated to the terminal from the resource manager 40 and the case where a resource is allocated to the terminal from the resource allocation part 34 to be described later, the resource information holding part 22 holds the allocated information on a resource as being the information on a resource that has actually allocated to the terminal with respect to the QoS request that has been accepted by the QoS request acceptor 10.

For example, the resource information holding part 22 holds information on resources as shown in FIGS. 9A to 9C. Here, FIGS. 9A to 9C show transitions of the information on resources held by the resource information holding part 22. That is, for example, FIG. 9A shows a state in which the mobile terminal 1 is connected to the "ER2" shown in FIG. 5, and shows that resources have actually been allocated regarding the section "ER1-ER2" and the section "ER5-ER4". Also, for example, FIG. 9B shows a state in which the mobile terminal 1 is connected to the "ER3" shown in FIG. 5, and shows that resources have actually been allocated regarding the section "ER1-ER3" and the section "ER5-ER4". Furthermore, for example, FIG. 9C shows a state in which the mobile terminal 1 is not connected to the network, and shows that no resource has actually been allocated.

In the first embodiment, description has been made of a method wherein the resource information holding part 22 holds the information on resources actually allocated to a terminal, in either of the cases where a resource is allocated to the terminal from the resource manager 40 and the case where a resource is allocated to the terminal from the resource allocation part 34 to be described later. However, the embodiment is not restricted to this method. For example, the embodiment is also applicable to a method wherein the QoS request acceptor 10 does not hold information on the resource actually allocated to the terminal, but when accepting a resource unnecessity notification from the terminal, the QoS request acceptor 10 receives the information on the resource actually allocated to the terminal from the terminal and hold it.

The free resource information holding part 21 holds information on a resource delivered by the resource unnecessity notification, as information on a free resource that has not been used by any terminal. Specifically, when a resource unnecessity notification notifying that a resource allocated based on information on a resource has become unnecessary is accepted by the resource unnecessity notification accepting part 32 to be described later, the free resource information holding part 21 holds the information on resource delivered by the resource unnecessity notification, as information on a free resource. The held information is utilized in processing by the QoS request determination part 33 to be described later.

For example, the free resource information holding part 21 holds information on resources as shown in FIGS. 10A to 10C. Here, FIGS. 10A to 10C show transitions of the information on free resources held by the free resource information holding part 21. That is, FIG. 10A corresponds to FIG. 9A in a time series manner, and shows a state wherein the mobile terminal 1 is connected to the "ER2" as shown in FIG. 5. FIG. 10A also shows a state wherein resources have actually been allocated regarding the section "ER1-ER2" and the section "ER5-ER4", and no free resource has occurred. For example, FIG. 10B corresponds to FIG. 9B in a time series manner, and shows a state wherein the mobile terminal 1 is connected to the "ER3" as shown in FIG. 5. FIG. 10B also shows a state wherein resources has actually been allocated regarding the section "ER1-ER3" and the section "ER5-ER4", that is, information on the section "ER1-ER2" is held in the free resource information holding part 21, as information on a free resource. Also, for example, FIG. 10C corresponds to FIG. 9C in a time series manner, and shows a state wherein the mobile terminal 1 is not connected to the network. FIG. 10C also shows a state wherein not only information regarding the section "ER1-ER2", but also information regarding the section "ER1-ER3" and the section "ER5-ER4" is held in the free resource information holding part 21, as information on free resources.

Thus, the free resource information holding part 21 holds information on resources that have been allocated to a terminal and that have been delivered by the resource unnecessity notification, from the terminal, notifying that the resources has become unnecessary, as information on free resources.

The QoS request accepting part 31 accepts a QoS request requiring the utilization of a resource of the network with a predetermined communication speed quality, from a terminal connecting with the network. Specifically, upon acceptance of the QoS request from the terminal, the QoS request accepting part 31 transmits the QoS request to the QoS request determination part 33 to be described later. If no resource is allocated to the terminal by the QoS request acceptor 10 as the result of a determination by the QoS request determination part 33, the QoS request accepting part 31 transmits the QoS request that has been accepted from the terminal to the resource manager 40 as in the case of the conventional QoS request acceptor. Also, when the allocation of a resource to the terminal is performed by the resource manager 40, the QoS request accepting part 31 transmits information on the resource allocated by the resource manager 40 to the terminal as in the case of the conventional QoS request acceptor.

The resource unnecessity notification acceptor 32 accepts a resource unnecessity notification notifying that the resource allocated based on the information on the resource has become unnecessary, from the terminal. Specifically, upon acceptance of the resource unnecessity notification from the terminal, the resource unnecessity notification acceptor 32 causes the free resource information holding part 21 to hold the information on the resource delivered by the resource unnecessity notification.

For example, when the resource unnecessity notification acceptor 32 accepts, from the mobile terminal 1, a notification that a resource allocated based on information on a resource of the section "ER1-ER2" has become unnecessary (refer to FIGS. 9A and 9B), the resource unnecessity notification acceptor 32 causes the free resource information holding part 21 to hold information on the resource of the section "ER1-ER2".

The QoS request determination part 33 determines whether a resource allocated based on the information on a free resource held by the free resource information holding part 21 meets a new QoS request. Specifically, when the QoS request accepting part 31 accepts a new QoS request from any terminal connecting with the network, the QoS request determination part 33 determines whether a resource allocated based on the information on a free resource held by the free resource information holding part 21 meets the new QoS request, and transmits the determination result to the resource allocation part 34 or the QoS request accepting part 31.

Specifically, in the first embodiment, the QoS request determination part 33 determines that the resource allocated based on the information on the free resource meets the new QoS request, on the conditions that the bandwidth of the resource allocated based on the information on the free resource is not less than a bandwidth required by the new QoS request and that the delay of the free resource allocated based on the information on the free resource is not more than a delay required by the new QoS request.

For example, when the QoS request accepting part 31 accepts again a QoS request requiring the utilization of resources with the bandwidth "1 Mbps" and the delay "within 200 msec" regarding the section "ER1-ER2" and the section "ER5-ER4", the QoS request determination part 33 determines that resources allocated based on information on free resources meet a new QoS request, on the conditions that the bandwidth "2 Mbps" of the resources allocated based on the information on free resources held by the free resource information holding part 21 is not less than the bandwidth "1 Mbps" required by the new QoS request and that the delay "180 msec" of the resource allocated based on the information on the free resources is not more than a delay "200 msec" required by the new QoS request, and transmits the determination result to the resource allocation part 34.

The resource allocation part 34 transmits information on a free resource to a terminal that has required a new QoS request, and allocates a free resource as a resource meeting the new QoS request. Specifically, if it has been determined the resource allocated by the QoS request determination part 33 based on the information on the free resource meets the new QoS request, the 34 transmits the information on the free resource to the terminal that has required the new QoS request.

For example, the resource allocation part 34 transmits information on a resource of a bandwidth "20 Mbps" and a delay "180 msec" that are allocated based on information on a free resource, to a terminal that has required a new QoS request.

Figure 11:
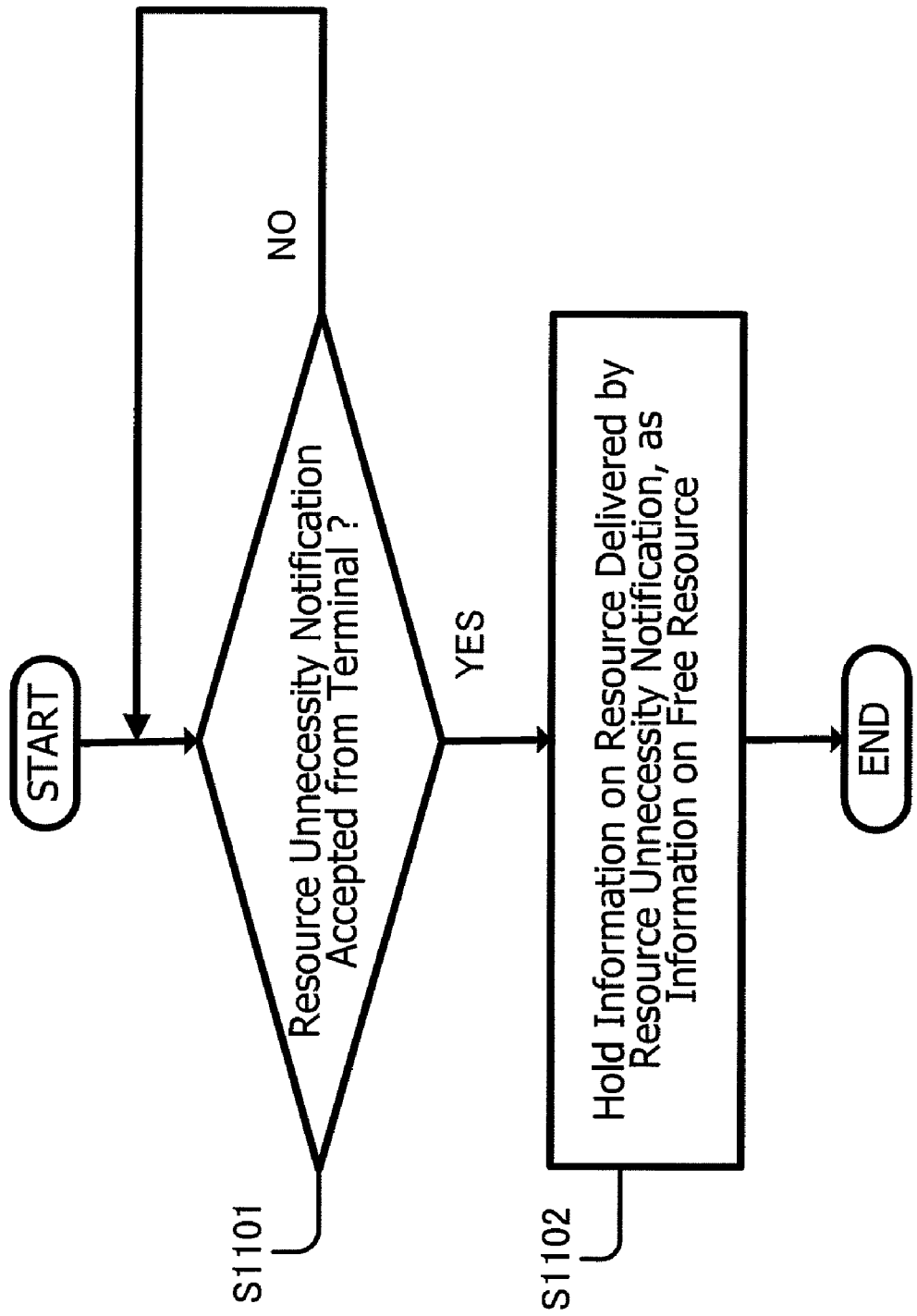
FIG. 11 is a flowchart illustrating an example of a procedure of a free resource information holding procedure according to an embodiment.
Figure 12:
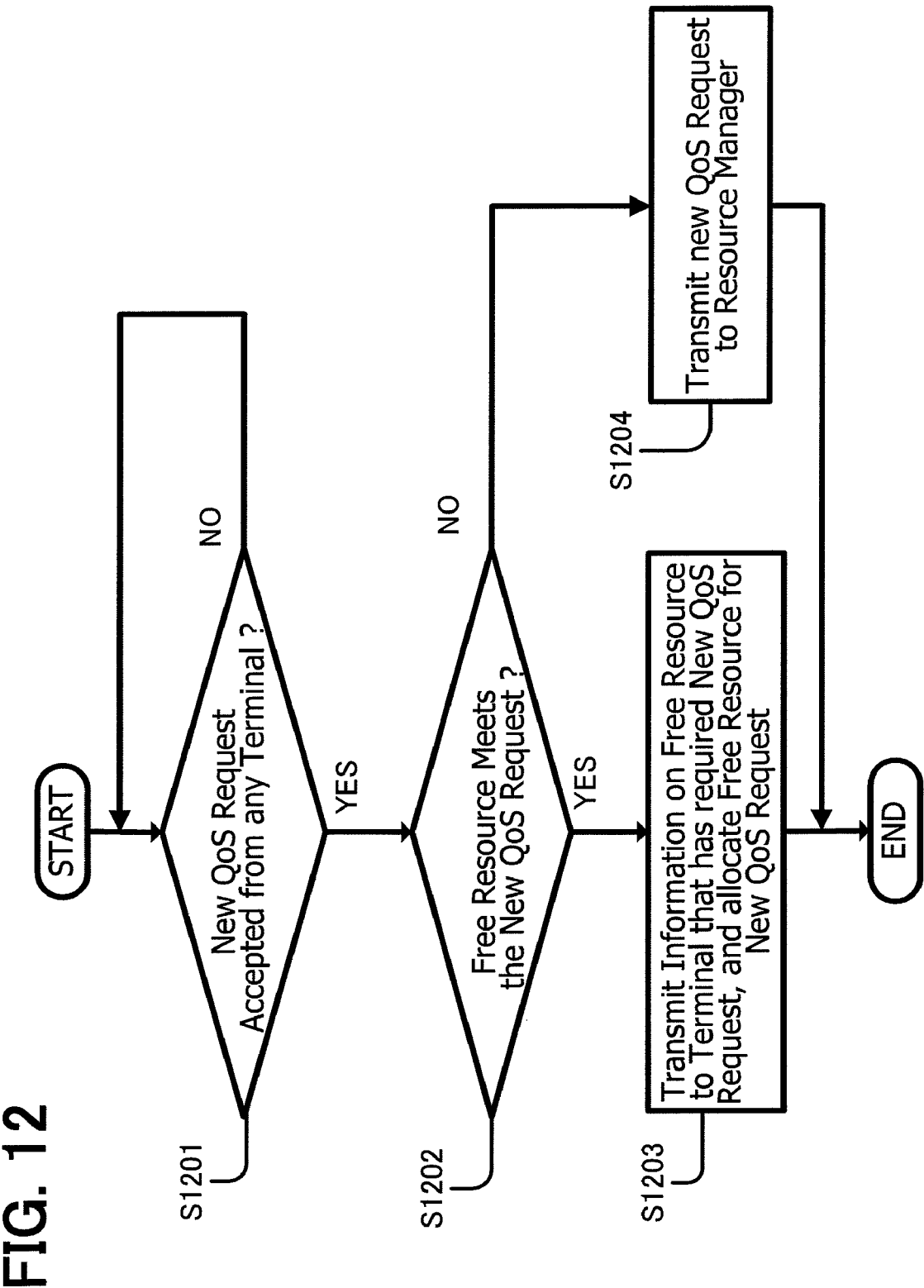
FIG. 12 is a flowchart illustrating an example of a procedure of a resource allocation procedure according to an embodiment.

Next, with reference to the drawings that have been used in explaining the configuration of the QoS providing system, and FIGS. 11 and 12, procedures of proceeding by the QoS providing system in the first embodiment will be described. Here, FIG. 11 is an example of a flowchart illustrating a procedure of the free resource information holding processing, and FIG. 12 is an example of a flowchart illustrating a procedure of the resource allocation processing.

Hereinafter, explanation is made by assuming one instance. Assumed instance is divided into four stages. A first stage is one in which the mobile terminal connecting with the "ER2" makes a QoS request requiring the utilization of a resource with a bandwidth "2 Mbps" and a delay "within 400 msec" regarding communications with the communication partner 1 connecting with "ER5", as shown in FIG. 5. A second stage is one in which, because the mobile terminal 1 has moved to become a subordinate of the "ER3", the mobile terminal 1 connecting with the "ER3" makes a QoS request requiring the utilization of a resource with a bandwidth "2 Mbps" and a delay "within 400 msec" regarding communications with the communications partner 1 connecting with "ER5", as shown in FIG. 5. A third stage is one in which the mobile terminal 1 has completed communications. A fourth stage is one in which the fixed terminal connecting with "ER2" makes a QoS request requiring the utilization of a resource with a bandwidth "1 Mbps" and a delay "within 200 msec" regarding communications with a communications partner 2 connecting with "ER5", as shown in FIG. 5.

Description is first made of the first stage. When the QoS request accepting part 31 of the QoS request acceptor 10 (1) accepts, from the mobile terminal 1 connecting with "ER2", a QoS request requiring the utilization of a resource with a bandwidth "2 Mbps" and a delay "within 400 msec" regarding communications with the communication partner 1 connecting with "ER5", the QoS request acceptor 10 (1) acquires information that the communication route is "ER5-ER4-ER1-ER2", from a network topology or route information that are held separately.

Then, the QoS request determination part 33 of the QoS request acceptor 10 (1) determines whether resources allocated based on the information on free resources held by the free resource information holding part 21 (resource cache) meet the QoS request. Here, in the first stage, as shown in FIG. 10A, it is assumed that the free resource information holding part 21 has no information on free resources. This being the case, the QoS request accepting part 31 of the QoS request acceptor 10 (1) transmits, to the resource manager 40 (2), a QoS request requiring the utilization of a resource with a bandwidth "2 Mbps" and a delay "within 200 msec" regarding the resource of the section "ER5-ER4", and transmits, to the resource manager 40 (1), a QoS request requiring the utilization of a resource with a bandwidth "2 Mbps" and a delay "within 200 msec" regarding a resource of the section "ER1-ER2".

Thereupon, since either of the resource information holding part 51 of the resource manager 40 (1) and the resource information holding part 51 of the resource manager 40 (2) holds resources meeting the QoS requests (refer to FIG. 6A and FIG. 7A), the resource information managing part 61 of the resource manager 40 (1) and the resource information managing part 61 of the resource manager 40 (2) subtracts a bandwidth "2 Mbps" from the remaining bandwidth (refer to FIG. 6B and FIG. 7B), and they transmit information on these resources to the QoS request accepting part 31 of the QoS request acceptor 10 (1).

Then, the QoS request accepting part 31 of the QoS request acceptor 10 (1) receives the information on resources, and transmits a reply message of "acceptance OK" to the mobile terminal 1. In the first embodiment, at this time, the information on the resources is held in the resource information holding part 22 of the QoS request acceptor 10 (1).

Description is next made of the second stage. The mobile terminal 1 moves to become a subordinate of the "ER3", and notifies the home agent of the movement thereof, as well as notifies the QoS request accepting part 31 of the QoS request acceptor 10 (1) that the resource allocated based on information on a resource have become unnecessary, as a resource unnecessity notification. The mobile terminal 1 also transmits a resource change request requiring the utilization of another resource of the network. Specifically, when the QoS request accepting part 31 of the QoS request acceptor 10 (1) accepts, from the mobile terminal 1 connecting with "ER3", a new QoS request requiring the utilization of a resource with a bandwidth "2 Mbps" and a delay "within 400 msec" regarding communications with the communication partner 1 connecting with "ER5", the QoS request acceptor 10 (1) determines that the resource of the section "ER1-ER2" has become unnecessary and a resource of the section "ER1-ER3" has newly become necessary.

Here, the QoS request acceptor 10 (1) holds information on resource of the section "ER1-ER2" that has become unnecessary, in the free resource information holding part 21, as information on a free resource that has not been used by any terminal. Next, the QoS request determination part 33 of the QoS request acceptor 10 (1) determines whether a resource allocated based on the information on a free resource held by the free resource information holding part 21 meets a new QoS request. In the second stage, as shown in FIG. 10B, the free resource information holding part 21 holds information on a free resource, but does not hold it regarding the section "ER1-ER3". Accordingly, the QoS request accepting part 31 of the QoS request acceptor 10 (1) transmits, to the resource manager 40 (1), a QoS request requiring the utilization of a resource with a bandwidth "2 Mbps" and a delay "within 200 msec" regarding the resource of the section "ER1-ER3".

Thereupon, since the resource information holding part 51 of the resource manager 40 (1) holds a resource meeting the QoS request (refer to FIG. 6B), the resource information managing part 61 of the resource manager 40 (1) subtracts a bandwidth "2 Mbps" from the remaining bandwidth, and it transmits information on this resource to the QoS request accepting part 31 of the QoS request acceptor 10 (1).

Then, the QoS request accepting part 31 of the QoS request acceptor 10 (1) receives the information on this resource, and transmits a reply message of "acceptance OK" to the mobile terminal 1. In the first embodiment, at this time, the information on the resource is held in the resource information holding part 22 of the QoS request acceptor 10 (1).

Description is next made of the third stage. Since this stage is one in which the mobile terminal 1 has completed communications, the QoS request acceptor 10 (1) holds information on free resources of the section "ER1-ER3" and the section "ER5-ER4" that have become unnecessary, as information on free resources that have not been used by any terminal (refer to FIG. 10C).

Description is last made of the fourth stage. When the QoS request accepting part 31 of the QoS request acceptor 10 (1) accepts, from the fixed terminal connecting with "ER2", a new QoS request requiring the utilization of a resource with a bandwidth "1 Mbps" and a delay "within 400 msec" regarding communications with the communications partner 2 connecting with the "ER5", the QoS request acceptor 10 (1) acquires information that the communication route is "ER5-ER4-ER1-ER2", from a network topology or route information that are held in an extra manner.

Next, the QoS request determination part 33 of the QoS request acceptor 10 (1) determines whether a resource allocated based on information on free resource held by the free resource information holding part 21 meets a new QoS request. Here, in the fourth stage, as shown in FIG. 10C, since the free resource information holding part 21 holds the information on the free resource, the QoS request determination part 33 of the QoS request acceptor 10 (1) determines whether the information on the free resource meets the new QoS request.

Specifically, the QoS request determination part 33 determines that a resource allocated based on the information on the free resource meets the new QoS request, on the conditions that the bandwidth "2 Mbps" of the resource allocated based on the information on free resource is not less than a bandwidth "1 Mbps" required by the new QoS request and that the delay "180 msec" of the resource allocated based on the information on the free resource is not more than a delay "200 msec" required by the new QoS request.

Then, the resource allocation part 34 of the QoS request acceptor 10 (1) transmits the information on the free resource (reply message of "acceptance OK" or the like) to the fixed terminal, and allocates the free resource as a resource meeting the new QoS request.

Procedure of free resource holding processing is now described with reference to FIG. 11. In the resource unnecessity notification accepting part 32, the QoS request acceptor 10 determines whether a resource unnecessity notification notifying that a resource allocated based on the information on the resource has become unnecessary, has been accepted from a terminal (step S1101). If the resource unnecessity notification has not been accepted ("No" determination in S1101), in the resource unnecessity notification accepting part 32, the QoS request acceptor 10 returns to the processing for determining whether the resource unnecessity notification has been accepted from the terminal.

On the other hand, if the resource unnecessity notification has been accepted ("Yes" determination in S1101), in the free resource information holding part 21, the QoS request acceptor 10 holds the information on the resource delivered by the resource unnecessity notification, as information on a free resource that has not been used by any terminal.

Next, proceeding for resource allocation is explained with reference to FIG. 12. In the QoS request accepting part 31, the QoS request acceptor 10 determines whether a new QoS request has been accepted from any terminal connecting with the network (step S1201). If the new QoS request has not been accepted ("No" determination in S1201), in the QoS request accepting part 31, the QoS request acceptor 10 returns to the processing for determining whether the new QoS request has been accepted from any terminal.

On the other hand, if the new QoS request has been accepted ("Yes" determination in S1201), in the QoS request determination part 33, the QoS request acceptor 10 determines whether a resource allocated based on the information on the free resource held by free resource information holding part 21 meets the new QoS request (step S1202). If the free resource does not meet the new QoS request ("No" determination in step 1202), in the QoS request accepting part 31, the QoS request acceptor 10 transmits the new QoS request to the resource manager 40 (step S1204).

On the other hand, if the free resource meets the new QoS request ("Yes" determination in step 1202), in the resource allocation part 34, the QoS request acceptor 10 transmits information on the free resource to the terminal that has required the new QoS request, and allocates the free resource as a resource meeting the new QoS request (step S1203).

Thus, the QoS request acceptor according to the first embodiment allows a reduction in the time necessary for resource allocation, and high-speed processing of QoS request acceptance.

As describe hereinabove, according to the first embodiment, without transmitting a resource securement request to the resource managing portion, the resource held in a free resource information holding part (resource cache) is reused to allocate a resource meeting a new QoS request. This allows a reduction in the time required for resource allocation and high-speed processing of a QoS request acceptance.

According to the first embodiment, since, when the terminal connected with the network changes the connection thereof with the network, the QoS request acceptor accepts a resource change request, as the resource unnecessity notification, the resource change request notifying that a resource allocated based on the information on the resource has become unnecessary and also requiring the utilization of another resource of the network, it is possible to hold the information on the free resource on an occasion when the terminal changes the connection thereof with the network.

Also, according to the first embodiment, since the QoS request acceptor determines that the resource allocated based on the information on a resource meets the new QoS request, on the condition that the bandwidth of resource allocated based on the information on a resource is not less than the bandwidth required by the new QoS request, and that the delay of the resource allocated based on the information on the resource is not more than the delay required by the new QoS request, it is possible to exert an effect of reliably performing resource allocation in addition to the above-described effect.

So far, as the first embodiment, a method wherein the QoS request acceptor holds information on free resources has been described, but this method is not one that manages the validity period of information on free resources. Accordingly, hereinafter, as a second embodiment, a method is explained wherein the QoS request acceptor manages the information on free resources together with a validity period thereof, and when the time period during which information is held exceeds the validity period, the resource allocated based on this information is returned to the resource manager.

As shown in FIG. 13, the free resource information holding part 21 of the QoS request acceptor 10 according to the second embodiment manages the information on free resources together with the validity periods of the information on free resources. Specifically, the QoS request acceptor 10 in the second embodiment defines the validity period (use-by date) of information on a free resource. The QoS request acceptor 10 in the second embodiment can be configured to further include a resource return part 35 as shown in FIG. 2. If a time period during which the information on a free resource held by the free resource information holding part 21 is held exceeds the defined validity period thereof, the resource return part 35 deletes the information held by the free resource information holding part 21, and also transmits a resource return notification notifying of returning the resource allocated based on this information, to the resource manager 40.

To specifically explain the foregoing by an example, the QoS request acceptor 10 defines the validity period (use-by date) of information on a free resource as "2 min". If a time period during which the information on a free resource held by the free resource information holding part 21 exceeds "2 min" (i.e., if the resource allocated based on the information on a free resource has never been reused for a new QoS request for "2 min"), the resource return part 35 deletes the information held by the free resource information holding part 21 (a resource usable with a bandwidth "2 Mbps" and a delay "within 180 msec" regarding the section "ER5-ER4"), and transmits a resource return notification to the resource manager 40 (out of information held in the resource information holding part 51, the resource manager 40 changes the remaining resources of delay guarantee class regarding to resource of the section "ER5-ER4" from "18 Mbps" to "20 Mbps").

In the exemplification in FIG. 13, the free resource information holding part 21 manages the resource and the "time when the resource starts to be held" in a relation to each other, and when a value obtained by subtracting the "time when the resource starts to be held" from the current time exceeds the validity period separately defined, the resource return part 35 deletes the information held by the free resource information holding part 21 and transmits a resource return notification to the resource manager 40. In the second embodiment, the method wherein the free resource information holding part 21 or the resource return part 35 manages the validity period in the above-described form has been described, but the embodiment is not limited to this method. Other possible methods for specifically realizing the management of the validity period include a method wherein the resource return part 35 manages whether the time period during which information has been held exceeds the validity period by the free resource information holding part 21 counting backward the validity period from the time when the information on a free resource starts to be held; and a method wherein the free resource information holding part 21 also manages the number of reuses of the information on the free resource, and pieces of information on free resources such that the time periods during which they are held exceed the validity period, are deleted in ascending order of the number of reuses thereof.

As discussed above, according to the second embodiment, since the QoS request acceptor manages information on free resources together with validity period of the resources, and when the period during which the information on free resources has been held exceeds the validity period, the QoS request acceptor deletes the held information, and transmits a resource return notification to the resource manager, it is possible to exert an effect of efficiently performing resource allocation in addition to the above-described effects.

Specifically, the resources (resource cache) held by a QoS request acceptor as information on free resources are ones that are occupied by the QoS request acceptor, and cannot be utilized in another QoS request acceptor. As a result, when the validity period (use-by date) is exceeded, resources that are not allocated as resources meeting a new QoS request (i.e., resources that are less likely to be reused) are returned to the resource manager. Therefore, the QoS request acceptor does not uselessly occupy resources, thereby allowing an arbitrary resource manager to utilize the returned resources.

So far, as the first and second embodiments, a method has been explained wherein the QoS request acceptor determines that a resource allocated based on the information on the resource meets a new QoS request, on the condition that the bandwidth of a resource allocated based on the information on the free resource is not less than the bandwidth required by the new QoS request, and that the delay of a resource allocated based on the information on the resource is not more than the delay required by the new QoS request. However, the embodiment is not restricted to this method. The embodiment is also applicable to a method wherein the QoS request acceptor determines that a resource allocated based on information on resources meets a new QoS request, on the condition that the proportion of a bandwidth required by the new QoS request in the bandwidth of the resource allocated based on the information on the resource exceeds a predetermined threshold value. Accordingly, hereinafter, as a third embodiment, this method is described wherein the QoS request acceptor performs the determination under the condition that the proportion of a bandwidth required by the new QoS request in the bandwidth of the resource allocated based on the information on the resource exceeds a predetermined threshold value.

The QoS request determination part 33 of the QoS request acceptor 10 according to the third embodiment determines that a resource allocated based on the information on the resource meets a new QoS request, on the condition that the proportion of a bandwidth required by the new QoS request in the bandwidth of the resource allocated based on the information on the resource exceeds a predetermined threshold value.

To specifically explain by an example, the QoS request determination part 33 of the QoS request acceptor 10 is assumed to define a predetermined threshold value as "80%". In the fourth stage described in the first embodiment, when the QoS request acceptor 10 accepts a QoS request, from the fixed terminal connecting with the "ER2", requiring the utilization of a resource with a bandwidth "1 Mbps" and a delay "within 400 msec" regarding communications with the communication partner 2 connecting with "ER5", the QoS request acceptor 10 (1) acquires information that the communication route is "ER5-ER4-ER1-ER2", from a network topology or route information that are held separately.

Next, the QoS request determination part 33 of the QoS request acceptor 10 (1) determines whether a resource allocated based on the information on free resources held by the free resource information holding part 21 meets a new QoS request. Here, in the fourth stage, as shown in FIG. 10C, since the free resource information holding part 21 holds information on free resources, the QoS request determination part 33 of the QoS request acceptor 10 (1) determines whether the information on free resources meets the new QoS request.

Specifically, the QoS request determination part 33 determines that a resource allocated based on the information on a free resource meets the new QoS request, on the conditions that a bandwidth "2 Mbps" of the resource allocated based on the information on free resources is not less than the bandwidth "1 Mbps" required by the new QoS request, that a delay "180 msec" of the resource allocated based on the information on free resources is not more than the delay "200 msec" required by the new QoS request, and in addition, that the proportion of the bandwidth required by the new QoS request in the bandwidth of a resource allocated based on the information on the resource exceeds the predetermined threshold value "80%".

Thereupon, since the proportion "50%" of the bandwidth "1 Mbps" required by the new QoS request in the bandwidth "2 Mbps" of the resource allocated by the information on resources does not exceed the predetermined threshold value "80%", the QoS request determination part 33 determines that the information on the resource does not meet the new QoS request, and transmits the new QoS request to the resource manager 40 (1).

If another QoS request requiring the utilization of a resource with a bandwidth "2 Mbps" and a delay "within 400 msec" occurs in the same section, then, the proportion "100%" of the bandwidth "2 Mbps" required by the other QoS request in the bandwidth "2 Mbps" of the resource allocated based on the information on the resource exceeds the predetermined threshold value "80%". Since the other conditions are also met as well as the above-described condition, the resource allocation part 34 of the QoS request acceptor 10 (1) transmits information on free resource ("OK" reply message or the like) to the fixed terminal, and allocates thereto a free resource as information meeting the other QoS request.

In the event that the QoS request acceptor 10 (1) has allocated a resource allocated based on formation on a free resource, to a QoS request for the bandwidth "1 Mbps" accepted earlier, since only a bandwidth "1 Mbps" is utilized out of the bandwidth "2 Mbps", the remaining bandwidth "1 Mbps" goes to waste. In addition, when a next QoS request for "2 Mbps" comes, the resource allocated based on the information on the free resource has already been utilized and is unusable. Thus, as compared with the case where no control by the threshold value is provided, performing control by the threshold value allows using a bandwidth wider by "1 Mbps", and an efficient resource allocation.

As described above, according to the third embodiment, since the QoS request acceptor determines that the resource allocated based on the information on the resource meets a new QoS request, on the condition that the proportion of the bandwidth required by the new QoS request in the bandwidth of the resource allocated based on the information on the resource exceeds the predetermined threshold value, it is possible to exert an effect of efficiently performing resource allocation in addition to the above-described effects.

It is to be understood that the embodiment may be variously practiced otherwise than as specifically described.

In the above-described embodiments, description has been made under the assumption that the terminal is premised upon a mobile terminal utilizing a mobile IP protocol, and that the resource unnecessity notification from the terminal to the QoS request acceptor is a resource change request in the case where the mobile terminal connecting with the network changes the connection thereof with the network, but the embodiment is not limited to this assumption. The embodiment is also applicable to a case where it is assumed that, for example, the terminal is premised upon a usual fixed terminal, and that the resource unnecessity notification from the fixed terminal to the QoS request acceptor is a resource release notification in the case where the fixed terminal connecting with the network stops the connection thereof to the network.

In the above-described embodiments, cases where a resource required by a QoS request across a plurality of areas has been described, but the embodiment is not limited to this cases. The embodiment is also applicable to a case where the resource required by a QoS request is closed in a single area.

Also, in the above-described embodiments, explanation has been made of a method wherein the determination that a resource allocated by information on a resource meets a new QoS request, is based on the premises that a bandwidth allocated by the information on a resource is not less than the bandwidth required by a new QoS request, and that a delay allocated by the information on a resource is not more than the delay required by the new QoS request. However, the embodiment is not restricted to this method. The embodiment is also applicable to a method wherein the determination that a resource allocated by information on a resource meets a new QoS request, is based on the only premise that a bandwidth allocated by the information on a resource is not less than the bandwidth required by the new QoS request.

In the above-described embodiments, the description has been made of the case where the QoS request acceptor and the resource manager are implemented by mutually different devices, but the embodiment is not limited to this case. The embodiment is also applicable to a case where the QoS request acceptor and the resource manager are implemented by the same device.

Of processings described in the embodiments of the embodiment, all or parts of the processings that are described as being automatically performed can also be manually performed. Alternatively, all or parts of the processings (i.e., the updating in the release holding part of the resource managing part) that are described as being manually performed can be automatically performed by known methods (for example, resource information is received from a network management system or the like to automatically update the resource information). Besides, information including various pieces of data and parameters shown in the above descriptions and drawings, such as processing procedures, control procedures, and specified notation, can be arbitrarily changed unless otherwise stated.

The components of the devices in the drawings are functional and conceptual and do not necessarily required to be physically configured as illustrated (i.e., FIG. 2 and FIG. 3). That is, specific configurations of distribution and integration of the devices are not limited to the configurations in the drawings, and all or parts of the configurations can be configured by functionally or physically distributing and integrating in arbitrary units according to various loads or usage statuses, etc. Furthermore, all or arbitrary parts of the processing functions provided by the devices can be realized by a CPU or by programs interpreted and executed by the CPU, or can be implemented as hardware with a wired logic.

Figure 14:
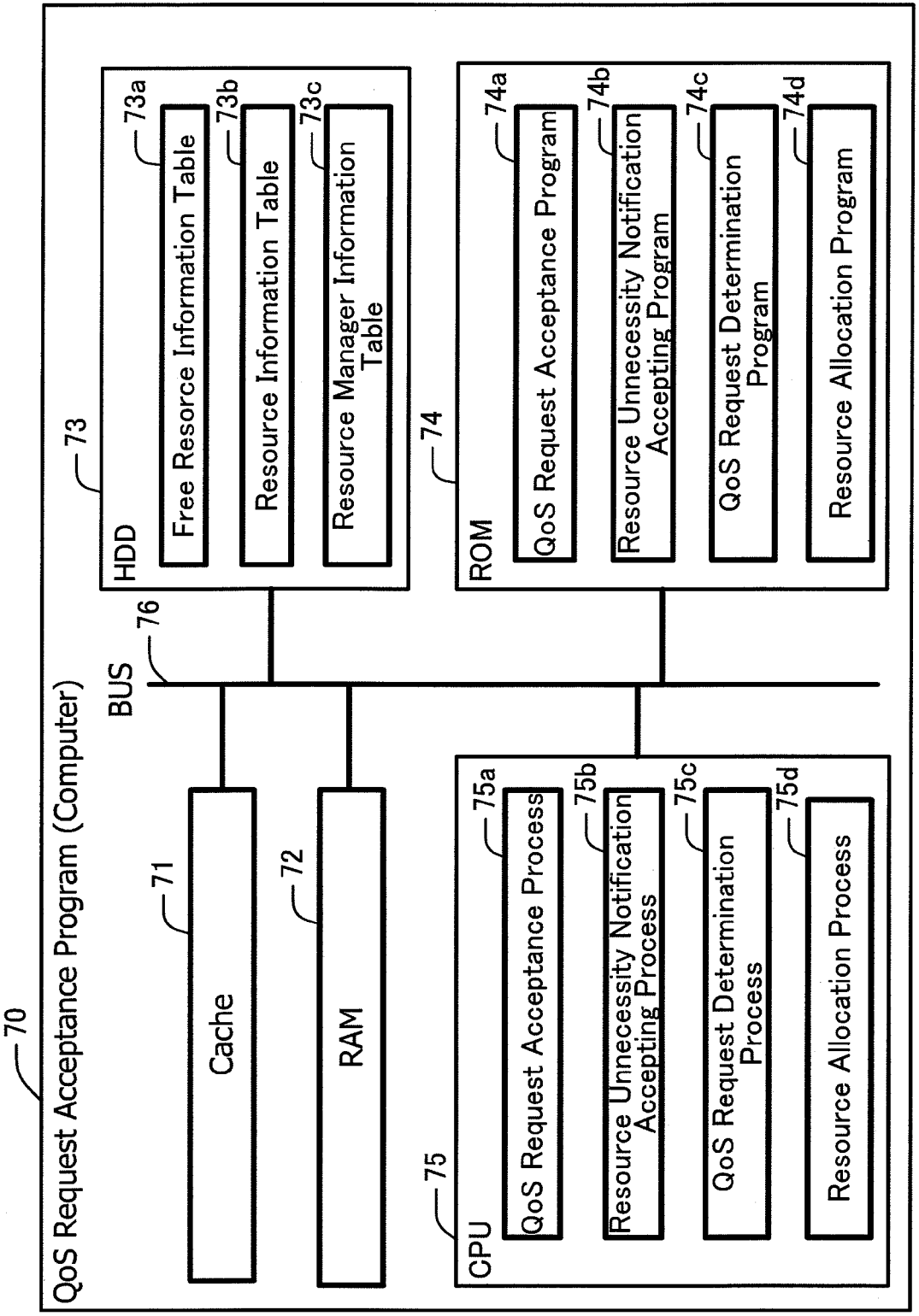
FIG. 14 is a representation illustrating an example of a computer executing a program for accepting a QoS request according to an embodiment.

Various processings described in the above-described embodiments can be realized by a computer, such as a personal computer or a work station, executing programs prepared in advance. Accordingly, hereinafter, description is given of an example of computer executing the QoS request acceptance program having the same function as those of the above-described embodiments, with reference to FIG. 14. FIG. 14 is a representation illustrating an example of a computer executing QoS request accepting program.

As shown in FIG. 14, the computer 70 is constituted by connecting a cache 71, a RAM 72, a HDD 73, a ROM 74, and a CPU 75, by a bus 76. Here, the HDD 73 stores in advance the QoS request acceptance program having the same function as that of the above-described embodiment 1. That is, as shown in FIG. 14, the HDD 73 stores in advance a QoS request acceptance program 74a, a resource unnecessity notification acceptance program 74b, a QoS request determination program 74c, and resource allocation program 74d.

The CPU 75 reads out and executes these programs 74a, 74b, 74c, and 74d, so that, as shown in FIG. 14, the programs 74a, 74b, 74c, and 74d, respectively, becomes a QoS request acceptance process 75a, a resource unnecessity notification acceptance process 75b, a QoS request determination process 75c, and resource allocation process 75d. Here, the processes 75a, 75b, 75c, and 75d, respectively, correspond to the QoS request accepting part 31, the resource unnecessity notification accepting part 32, the QoS request determination part 33, and the resource allocation part 34 showed in FIG. 2.

Also, as shown in FIG. 14, the HDD 73 includes a free resource information table 73a, a resource information table 73b, and resource manager information table 73c. Here, the tables 73a, 73b, and 73c, respectively, correspond to the free resource information holding part 21, the resource information holding part 22, and the resource manager information holding part 23 shown in FIG. 2.

The above-described programs 74a to 74d are not necessarily required to be stored in the ROM 74 in advance. For example, these programs may be previously stored in a "portable physical medium", such as a flexible disk (FD), a CD-ROM, a magneto-optical (MO) disk, a DVD disk, or an IC card, that is inserted into the computer 70, a "fixed physical medium", such as a hard disk drive (HDD), that is mounted inside or outside of the computer 70, or "another computer" (or a server) connected to the computer 70 through a public line, the Internet, a LAN, a WAN or the like, and then the computer 70 may read these programs from the above-described computer-readable recording medium, and execute them.

As described above, the QoS request acceptance program, the QoS request acceptor, and the QoS request accepting method according to the embodiment are useful in accepting a QoS request requiring the utilization of a resource of a network with a predetermined communication speed quality, from a terminal connecting with the network, and in allocating a resource to the terminal.

In particular, without transmitting a resource securement request to the resource manager, the resource held in a free resource information holding part (resource cache) is reused to allocate a resource meeting a new QoS request. This allows a reduction in the time required for resource allocation and high-speed processing of a QoS request acceptance. Therefore, the QoS request acceptance program, the QoS request acceptor, and the QoS request accepting method according to the embodiment are suitable for reducing the time necessary for resource allocation and processing the QoS request acceptance at a high speed.

What is claimed is:

1. A method of accepting a QoS request for utilizing resources of a network in a predetermined quality, the method being performed by an apparatus intervening between a terminal connected to the network and a resource manager for managing resources in the network, comprising:

performing a free resource information holding procedure comprising:

receiving, from the terminal connected to the network, a resource unnecessity notification indicating that a resource allocated to the terminal has become unnecessary, holding, within the apparatus, as free resource information, information on a first free resource notified by the resource unnecessity notification as an unnecessary resource, in association with a validity period of the first free resource, the free resource information including a first communication speed quality guaranteed by the first free resource, wherein when the free resource information has been held within the apparatus over the validity period, the free resource information is deleted and a resource return notification is transmitted to the resource manager, so as to notify the resource manager of the deleted free resource information;

performing a QoS request determination procedure comprising:

receiving, from the terminal, the QoS request requiring a second communication speed quality, and determining whether the first free resource meets the received QoS request or not by comparing the second communication speed quality with the first communication speed quality on the basis of the free resource information held within the apparatus;

performing a resource allocation procedure when the first free resource meets the received QoS request, the resource allocation procedure comprising:

allocating the first free resource to the terminal without passing the free resource information to the resource manager, and transmitting information on the allocated first free resource to the terminal; and performing a resource manager inquiry procedure when the first free resource does not meet the received QoS request, the resource manager inquiry procedure comprising:

transmitting the received QoS request to the resource manager so that the resource manager allocates a second free resource meeting the received QoS request to the terminal, receiving from the resource manager information on the second free resource allocated to the terminal by the resource manager when there is the second free resource meeting the received QoS request left in the resource manager, and transmitting information on the allocated second free resource to the terminal.

2. The method of claim 1, wherein
the free resource information holding procedure comprises accepting, as the resource unnecessity notification, a resource release notification notifying that the resource allocated to the terminal was released by the terminal, when disconnecting the terminal from the network.

3. The method of claim 1, wherein
the free resource information holding procedure comprises accepting, as the resource unnecessity notification, a resource changing request notifying that the resource allocated to the terminal has become unnecessary and other resource should be allocated to the terminal, when the terminal changes connection with the network.

4. The method of claim 1, wherein
the first and second communication speed qualities include a first bandwidth and a second bandwidth, respectively, and
the QoS request determination procedure comprises determining that the first free resource meets the QoS request, on the condition that the first bandwidth of the first communication speed quality guaranteed by the first free resource is not less than the second bandwidth of the second communication quality required by the QoS request.

5. The method of claim 1, wherein
the first communication speed quality includes a first bandwidth and a first delay,
the second communication speed quality includes a second bandwidth and a second delay, and
the QoS request determination procedure comprises determining that the first free resource meets the QoS request, on the conditions that the first bandwidth of the first communication speed quality guaranteed by the first free resource is not less than the second bandwidth of the second communication speed quality required by the QoS request and that the first delay of the first communication speed quality guaranteed by the first free resource is not more than the second delay of the second communication quality required by the QoS request.

6. The method of claim 1, wherein
the first and second communication speed qualities include a first bandwidth and a second bandwidth, respectively, and
the QoS request determination procedure comprises determining that the first free resource meets the QoS request, on the condition that a proportion of the second bandwidth required by the QoS request in the first bandwidth guaranteed by the first free resource exceeds a predetermined threshold value.

7. An apparatus for accepting QoS request for utilizing resources of a network in a predetermined quality, the apparatus intervening between a terminal connected to the network and a resource manager for managing resources in the network, comprising:

a resource unnecessity notification accepting part configured to receive, from the terminal connected to the network, a resource unnecessity notification notifying that a resource allocated to the terminal has become unnecessary;

a free resource information holding part configured to hold, as free resource information, information on a first free resource notified by the resource unnecessity notification as an unnecessary resource, in association with a validity period of the first free resource, the free resource information including a first communication speed quality guaranteed by the first free resource;

a resource return part configured to return a released resource to the resource manager by transmitting, to the resource manager, a resource return notification including information on the released resource, wherein the resource return part deletes the free resource information when the free resource information has been held within the apparatus over the validity period, and transmits the resource return notification to the resource manager so as to notify the resource manager of information on the deleted free resource information;

a QoS request accepting part configured to receive, from the terminal, a QoS request requiring a second communication speed quality;

a QoS request determination part configured to determine whether the first free resource meets the QoS request received from the terminal, by comparing the second communication speed quality with the first communication speed quality on the basis of the free resource information held within the apparatus; and a resource allocation part configured to allocate the first free resource to the terminal when the first free resource meets the received QoS request, and to transmit information on the allocated first free resource to the terminal, without passing the free resource information to the resource manager, wherein the QoS request accepting part:

transmits the received QoS request to the resource manager when the first free resource does not meet the received QoS request so that the resource manager allocates a second free resource meeting the received QoS request to the terminal, receives, from the resource manager, information on the second free resource allocated to the terminal by the resource manager when there is the second free resource meeting the received QoS request left in the resource manager, and transmits the information on the allocated second free resource to the terminal.

8. The apparatus of claim 7, wherein
the resource unnecessity notification accepting part accepts, as the resource unnecessity notification, a resource release notification notifying that the resource allocated to the terminal was released by the terminal, when disconnecting the terminal from the network.

9. The apparatus of claim 7, wherein
the resource unnecessity notification accepting part accepts, as the resource unnecessity notification, a resource changing request notifying that the resource allocated to the terminal has become unnecessary and other resource should be allocated to the terminal, when the terminal changes connection with the network.

10. The apparatus of claim 7, wherein
the first and second communication speed qualities include a first bandwidth and a second bandwidth, respectively, and
the QoS request determination part determines that the first free resource meets the QoS request, on the condition that the first bandwidth of the first communication speed quality guaranteed by the first free resource is not less than the second bandwidth of the second communication speed quality required by the QoS request.

11. The apparatus of claim 7, wherein
the first communication speed quality includes a first bandwidth and a first delay,
the second communication speed quality includes a second bandwidth and a second delay, and
the QoS request determination part determines that the first free resource meets the QoS request, on the conditions that the first bandwidth of the first communication speed quality guaranteed by the first free resource is not less than the second bandwidth of the second communication speed quality required by the QoS request and that the first delay of the first communication speed quality guaranteed by the first free resource is not more than the second delay of the second communication speed quality required by the QoS request.

12. The apparatus of claim 7, wherein
the first and second communication speed qualities include a first bandwidth and a second bandwidth, respectively, and
the QoS request determination part determines that the first free resource meets the QoS request, on the condition that a proportion of the second bandwidth required by the QoS request in the first bandwidth guaranteed by the first free resource exceeds a predetermined threshold value.

13. A non-transitory computer readable recording medium storing a program to accept a QoS request for utilizing resources of a network in a predetermined quality, the program being executed by an apparatus including a computer and intervening between a terminal connected to the network and a resource manager for managing resources in the network, the program, when executed, causing the computer to perform a process comprising:

performing a free resource information holding procedure comprising:
receiving, from the terminal connected to the network, a resource unnecessity notification indicating that resource allocated to the terminal has become unnecessary, and
holding within the apparatus, as a free resource information, information on first free resource notified by the resource unnecessity notification as unnecessary resource, in association with a validity period of the first free resource, the free resource information including a first communication speed quality guaranteed by the first free resource, wherein
when the free resource information has been held within the apparatus over the validity period, the free resource information is deleted and a resource return notification is transmitted to the resource manager, so as to notify the resource manager of the deleted free resource information;

performing a QoS request determination procedure comprising:
receiving, from the terminal, the QoS request requiring a second communication speed quality, and
determining whether the first free resource meets the received QoS request or not by comparing the second communication speed quality with the first communication speed quality on the basis of the free resource information held within the apparatus;

performing a resource allocation procedure when the first free resource meets the received QoS request, the resource allocation procedure comprising:
allocating the first free resource to the terminal, without passing the free resource information to the resource manager, and
transmitting information on the allocated first free resource to the terminal; and performing a resource manager inquiry procedure when the first free resource does not meet the received QoS request, the resource manager inquiry procedure comprising:
transmitting the received QoS request to the resource manager so that the resource manager allocates a second free resource meeting the received QoS request to the terminal,
receiving from the resource manager information on the second free resource allocated to the terminal by the resource manager when there is the second free resource meeting the received QoS request left in the resource manager, and transmitting information on the allocated second free resource to the terminal.

14. The non-transitory computer readable recording medium storing the program according to claim 13, wherein the free resource information holding procedure comprises accepting, as the resource unnecessity notification, a resource release notification notifying that the resource allocated to the terminal was released by the terminal, when disconnecting the terminal from the network.

15. The non-transitory computer readable recording medium storing the program according to claim 13, wherein the free resource information holding procedure comprises accepting, as the resource unnecessity notification, a resource changing request notifying that a resource allocated to the terminal has become unnecessary and other resource should be allocated to the terminal, when the terminal changes connection with the network.

16. The non-transitory computer readable recording medium storing the program according to claim 13, wherein the first and second communication speed qualities include a first bandwidth and a second bandwidth, respectively, and the QoS request determination procedure comprises determining that the first free resource meets the QoS request, on the condition that the first bandwidth of the first communication speed quality guaranteed by the first free resource is not less than the second bandwidth of the second communication quality required by the QoS request.

17. The non-transitory computer readable recording medium storing the program according to claim 13, wherein the first and second communication speed qualities include a first bandwidth and a second bandwidth, respectively, and the QoS request determination procedure comprises determining that the first free resource meets the QoS request, on the condition that a proportion of the second bandwidth required by the QoS request in the first bandwidth guaranteed by the first free resource exceeds a predetermined threshold value.

* * * * *